United States Patent
Fang

(10) Patent No.: US 10,165,583 B2
(45) Date of Patent: Dec. 25, 2018

(54) SCHEDULING METHOD, APPARATUS, AND SYSTEM

(71) Applicant: Huawei Technologies Co., Ltd., Shenzhen (CN)

(72) Inventor: Zhipeng Fang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 15/181,349

(22) Filed: Jun. 13, 2016

(65) Prior Publication Data

US 2016/0295601 A1    Oct. 6, 2016

Related U.S. Application Data

(63) Continuation of application No. PCT/CN2013/089328, filed on Dec. 13, 2013.

(51) Int. Cl.
| | |
|---|---|
| *H04W 72/12* | (2009.01) |
| *H04W 28/08* | (2009.01) |
| *H04W 52/04* | (2009.01) |
| *H04W 52/24* | (2009.01) |
| *H04W 4/00* | (2018.01) |

(52) U.S. Cl.
CPC ....... *H04W 72/1205* (2013.01); *H04W 28/08* (2013.01); *H04W 52/04* (2013.01); *H04W 52/243* (2013.01); *H04W 72/12* (2013.01)

(58) Field of Classification Search
CPC . H04W 72/1205; H04W 52/04; H04W 28/08; H04W 72/12; H04W 52/243
USPC ........................................................ 370/329
See application file for complete search history.

(56) References Cited

U.S. PATENT DOCUMENTS

| | | | |
|---|---|---|---|
| 9,648,624 B2* | 5/2017 | Geijer Lundin | .. H04W 72/0486 |
| 2004/0127223 A1 | 7/2004 | Li et al. | |
| 2007/0225002 A1 | 9/2007 | Keller et al. | |

(Continued)

FOREIGN PATENT DOCUMENTS

| | | |
|---|---|---|
| CN | 1501607 A | 6/2004 |
| CN | 102348268 A | 2/2012 |

(Continued)

*Primary Examiner* — Faisal Choudhury
(74) *Attorney, Agent, or Firm* — Leydig, Voit & Mayer, Ltd.

(57) ABSTRACT

A scheduling method, apparatus, and system are provided. The system includes at least one real scheduler and a centralized virtual scheduler. The centralized virtual scheduler is configured to determine transmit power of a first cell and send the transmit power determined by the determining unit to a real scheduler corresponding to the first cell, so as to instruct the real scheduler corresponding to the first cell to schedule UE in the first cell by using the transmit power determined by the centralized virtual scheduler. Therefore, by using a layered scheduling architecture according to the present application, an upper-layer centralized virtual scheduler instructs, by performing comprehensive coordination on transmit power of multiple cells, a lower-layer real scheduler to schedule UE by using the transmit power coordinated by the centralized virtual scheduler. This can reduce inter-cell interference and improve overall network performance.

11 Claims, 13 Drawing Sheets

A central user equipment uses all bandwidth

An edge user equipment uses partial bandwidth

(56) References Cited

U.S. PATENT DOCUMENTS

| | | | |
|---|---|---|---|
| 2007/0280175 A1* | 12/2007 | Cheng | H04B 7/022 370/338 |
| 2012/0122512 A1 | 5/2012 | Nammi et al. | |
| 2013/0077586 A1 | 3/2013 | Damnjanovic et al. | |
| 2013/0225193 A1* | 8/2013 | Lee | H04W 72/1231 455/452.2 |
| 2014/0133415 A1* | 5/2014 | Damnjanovic | H04W 52/30 370/329 |
| 2014/0219267 A1* | 8/2014 | Eyuboglu | H04W 56/001 370/350 |
| 2014/0226623 A1* | 8/2014 | Seo | H04W 36/0055 370/331 |
| 2015/0087296 A1* | 3/2015 | Kim | H04W 52/365 455/422.1 |
| 2015/0319716 A1* | 11/2015 | Park | H04W 16/32 370/329 |

FOREIGN PATENT DOCUMENTS

| | | |
|---|---|---|
| CN | 102547994 A | 7/2012 |
| CN | 103167557 A | 6/2013 |
| EP | 2493235 A1 | 8/2012 |
| JP | 2009539321 A | 11/2009 |
| JP | 2012074819 A | 4/2012 |
| KR | 20040028445 A | 4/2004 |
| KR | 20090008421 A | 1/2009 |
| WO | 2013093973 A1 | 6/2013 |
| WO | 2013110641 A1 | 8/2013 |

* cited by examiner

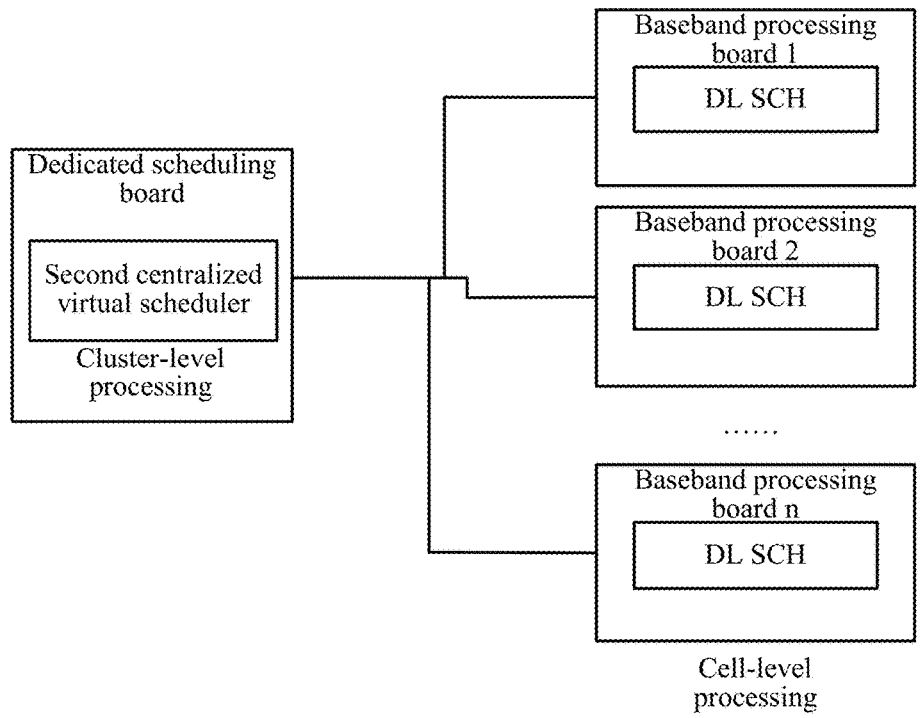

FIG. 14

| A centralized virtual scheduler determines transmit power of a first cell, where the first cell is each cell of multiple cells in a communications system | 1501 |

| The centralized virtual scheduler sends the transmit power determined by the centralized virtual scheduler to a real scheduler corresponding to the first cell, so as to instruct the real scheduler corresponding to the first cell to schedule a UE in the first cell by using the transmit power determined by the centralized virtual scheduler | 1502 |

FIG. 15

SCHEDULING METHOD, APPARATUS, AND SYSTEM

CROSS-REFERENCE TO RELATED APPLICATIONS

This application is a continuation of International Application No. PCT/CN2013/089328, filed Dec. 13, 2013, which is hereby incorporated by reference in its entirety.

TECHNICAL FIELD

Embodiments of the present application relate to the field of communications technologies, and in particular, to a scheduling method, apparatus, and system.

BACKGROUND

Respective development of mobile communications and broadband wireless access technologies has resulted in mutual penetration of their services. In order to meet a requirement of broadband mobile communications and a challenge of mobile broadband communications, an LTE (Long Term Evolution) communications system is introduced into the mobile communication technologies.

Application of an OFDM (orthogonal frequency division multiplexing) technology in the LTE communications systems enables sub-channels to be orthogonal to each other, which well resolves a problem of intra-cell interference. However, because the LTE system has a higher requirement for spectrum utilization, a single-frequency networking manner is introduced to improve the spectrum utilization, but this leads to a problem of inter-cell interference. For example, if neighboring cells use a same spectrum resource in an overlapping area covered by the neighboring cells, serious ICI (inter-cell interference) occurs in the overlapping area. It can be seen that, in the LTE communications system, the inter-cell interference is main interference that affects system performance.

In order to reduce the inter-cell interference, power control is separately performed for cells to adjust their respective downlink transmit power. However, as distributed control is less comprehensive, optimization can be performed only on a portion-by-portion basis, and optimal performance of an entire network cannot be achieved, resulting in poor system performance.

SUMMARY

Embodiments of the present application provide a scheduling method, apparatus, and system, so as to improve overall network performance.

A first aspect provides a centralized virtual scheduler, where the centralized virtual scheduler is applicable to a communications system that includes multiple cells, each cell in the multiple cells corresponds to one real scheduler, and the centralized virtual scheduler includes: a determining unit, configured to determine transmit power of a first cell, where the first cell is each cell in the multiple cells in the communications system; and an interface unit, configured to send the transmit power determined by the determining unit to a real scheduler corresponding to the first cell, so as to instruct the real scheduler corresponding to the first cell to schedule user equipment in the first cell by using the transmit power determined by the determining unit.

With reference to the first aspect, in a first implementation manner of the first aspect, the determining unit is specifically configured to: determine transmit power on each resource block (RB) unit of the first cell, where the RB unit includes a physical resource block (PRB) or a resource block group (RBG); and the interface unit is specifically configured to: send the transmit power on each RB unit of the first cell to the real scheduler corresponding to the first cell, so as to instruct the real scheduler corresponding to the first cell to schedule the user equipment on each RB unit of the first cell by using the transmit power determined by the determining unit.

With reference to the first aspect or the first implementation manner of the first aspect, in a second implementation manner of the first aspect, the multiple cells are grouped into at least one cluster, and the determining unit is specifically configured to determine transmit power of each cell in each cluster.

With reference to the second implementation manner of the first aspect, in a third implementation manner of the first aspect, the centralized virtual scheduler further includes a first obtaining unit, configured to obtain first channel information and first historical scheduling information, where the first channel information and the first historical scheduling information respectively include channel information and historical scheduling information of all cells in a cluster to which the first cell belongs; the determining unit is specifically configured to: calculate, according to the first channel information and the first historical scheduling information obtained by the first obtaining unit, network utility values of the first cell under multiple power candidates, and select a power candidate with an optimal network utility value as the transmit power of the first cell; or calculate, according to the first channel information and the first historical scheduling information obtained by the first obtaining unit, network utility values of each RB unit of the first cell under multiple power candidates, and select a power candidate with an optimal network utility value as transmit power of the RB unit for which calculation is currently performed.

With reference to the second or third implementation manner of the first aspect, in a fourth implementation manner of the first aspect, the centralized virtual scheduler further includes: a second obtaining unit, configured to obtain first load information, where the first load information includes load information of all cells in the cluster to which the first cell belongs, where: the determining unit is further configured to determine a load balancing result according to the first load information, where the load balancing result is that the first cell schedules edge user equipment of a second cell, and the first cell and the second cell are neighboring cells in the cluster to which the first cell belongs; and the interface unit is further configured to send the load balancing result to the real scheduler corresponding to the first cell, so as to instruct the real scheduler corresponding to the first cell to schedule the edge user equipment of the second cell.

With reference to the first aspect or any one implementation manner of the first to the fourth implementation manners of the first aspect, in a fifth implementation manner of the first aspect, the communications system is in a distributed base station networking mode and a coordinator is deployed in the communications system, base stations in the communications system are connected with the coordinator, the real scheduler corresponding to each cell is located in a base station corresponding to the cell, and the centralized virtual scheduler is located in the coordinator.

With reference to the fifth implementation manner of the first aspect, in a sixth implementation manner of the first aspect, the interface unit is further configured to: send a measurement request message to a real scheduler corresponding to a third cell in a downlink receive frame number and subframe number, and receive, in an uplink transmit frame number and subframe number, a measurement response message sent by the real scheduler corresponding to the third cell, where a round trip time (RTT) of the real scheduler corresponding to the third cell is a largest RTT in the multiple cells in the communications system, and the RTT indicates a difference between the uplink transmit frame number and subframe number and the downlink receive frame number and subframe number; the determining unit is further configured to: determine a start time according to the RTT of the real scheduler corresponding to the third cell; and the interface unit is further configured to: send the start time generated by the determining unit to the real scheduler corresponding to the first cell, so that the real scheduler corresponding to the first cell schedules the user equipment at the start time.

With reference to the first aspect or any one implementation manner of the first to the fourth implementation manners of the first aspect, in a seventh implementation manner of the first aspect, baseband processing units (BBUs) of the communications system are placed together, the real scheduler corresponding to each cell in the multiple cells is located in a BBU corresponding to the cell, and the centralized virtual scheduler is located in any BBU of the BBUs that are placed together.

A second aspect provides a real scheduler, where the real scheduler is applicable to a communications system that includes multiple cells, each cell in the multiple cells corresponds to one real scheduler, and the real scheduler includes: an interface unit, configured to receive transmit power, which is determined by a centralized virtual scheduler, of a first cell, where the first cell is each cell in the multiple cells in the communications system; and a scheduling unit, configured to schedule user equipment in the first cell by using the transmit power that is determined by the centralized virtual scheduler and received by the interface unit.

With reference to the second aspect, in a first implementation manner of the second aspect, the interface unit is specifically configured to: receive transmit power that is on each resource block (RB) unit of the first cell and determined by the centralized virtual scheduler, where the RB unit includes a physical resource block (PRB) or a resource block group (RBG); and the scheduling unit is specifically configured to: schedule the user equipment on each RB unit of the first cell by using the transmit power determined by the centralized virtual scheduler.

With reference to the second aspect or the first implementation manner of the second aspect, in a second implementation manner of the second aspect, the interface unit is further configured to: receive a load balancing result determined by the centralized virtual scheduler, where the load balancing result is that the first cell schedules edge user equipment of a second cell, and the first cell and the second cell are neighboring cells in the multiple cells and are located in a same cluster; and the scheduling unit is further configured to: schedule the edge user equipment of the second cell according to the load balancing result.

With reference to the second aspect or the first or the second implementation manner of the second aspect, in a third implementation manner of the second aspect, the communications system is in a distributed base station networking mode and a coordinator is deployed in the communications system, base stations in the communications system are connected with the coordinator, the real scheduler corresponding to each cell in the multiple cells is located in a base station corresponding to the cell, and the centralized virtual scheduler is located in the coordinator.

With reference to the third implementation manner of the second aspect, in a fourth implementation manner of the second aspect, the interface unit is further configured to: receive, in a downlink receive frame number and subframe number, a measurement request message sent by the centralized virtual scheduler, and send, in an uplink transmit frame number and subframe number, a measurement response message to the centralized virtual scheduler, so that the centralized virtual scheduler obtains a round trip time (RTT) of the real scheduler according to the uplink transmit frame number and subframe number and the downlink receive frame number and subframe number, select a largest RTT from all RTTs of the multiple cells in the communications system, and determine a start time according to the largest RTT, where the RTT indicates a difference between the uplink transmit frame number and subframe number and the downlink receive frame number and subframe number; and the interface unit is further configured to: receive the start time sent by the centralized virtual scheduler, and instruct the scheduling unit to schedule the user equipment at the start time.

With reference to the second aspect or the first or the second implementation manner of the second aspect, in a fifth implementation manner of the second aspect, baseband processing units (BBUs) of the communications system are placed together, the real scheduler corresponding to each cell in the multiple cells is located in a BBU corresponding to the cell, and the centralized virtual scheduler is located in any BBU of the BBUs that are placed together.

A third aspect provides a scheduling system, where the scheduling system includes any one of the foregoing centralized virtual schedulers and at least one of the foregoing real schedulers.

A fourth aspect provides a scheduling method, where the method is applicable to a communications system that includes multiple cells, the communications system includes a centralized virtual scheduler and at least one real scheduler, each cell in the multiple cells corresponds to one real scheduler, and the method includes: determining, by the centralized virtual scheduler, transmit power of a first cell, where the first cell is each cell in the multiple cells in the communications system; and sending, by the centralized virtual scheduler, the transmit power determined by the centralized virtual scheduler to a real scheduler corresponding to the first cell, so as to instruct the real scheduler corresponding to the first cell to schedule user equipment in the first cell by using the transmit power determined by the centralized virtual scheduler.

With reference to the fourth aspect, in a first implementation manner of the fourth aspect, the determining, by the centralized virtual scheduler, transmit power of a first cell includes: determining transmit power on each resource block (RB) unit of the first cell, where the RB unit includes a physical resource block (PRB) or a resource block group (RBG); and the sending, by the centralized virtual scheduler, the transmit power determined by the centralized virtual scheduler to a real scheduler corresponding to the first cell includes: sending the transmit power on each RB unit of the first cell to the real scheduler corresponding to the first cell, so as to instruct the real scheduler corresponding to the first cell to schedule the user equipment on each RB unit of the first cell by using the transmit power determined by the centralized virtual scheduler.

With reference to the fourth aspect or the first implementation manner of the fourth aspect, in a second implementation manner of the fourth aspect, the method further includes: grouping the multiple cells into at least one cluster, where: the determining, by the centralized virtual scheduler, transmit power of a first cell includes: determining, by the centralized virtual scheduler, transmit power of each cell in each cluster on a cluster-by-cluster basis.

With reference to the second implementation manner of the fourth aspect, in a third implementation manner of the fourth aspect, the determining, by the centralized virtual scheduler, transmit power of a first cell includes: obtaining, by the centralized virtual scheduler, first channel information and first historical scheduling information, where the first channel information and the first historical scheduling information respectively include channel information and historical scheduling information of all cells in a cluster to which the first cell belongs; and calculating network utility values of the first cell under multiple power candidates according to the first channel information and the first historical scheduling information, and selecting a power candidate with an optimal network utility value as the transmit power of the first cell; or calculating network utility values of each RB unit of the first cell under multiple power candidates according to the first channel information and the first historical scheduling information, and selecting a power candidate with an optimal network utility value as transmit power of the RB unit for which calculation is currently performed.

With reference to the second or the third implementation manner of the fourth aspect, in a fourth implementation manner of the fourth aspect, the method further includes: obtaining, by the centralized virtual scheduler, first load information, where the first load information includes load information of all the cells in the cluster to which the first cell belongs; determining a load balancing result according to the first load information, where the load balancing result is that the first cell schedules edge user equipment of a second cell, and the first cell and the second cell are neighboring cells in the cluster to which the first cell belongs; and sending, by the centralized virtual scheduler, the load balancing result to the real scheduler corresponding to the first cell, so as to instruct the real scheduler of the first cell to schedule the edge user equipment of the second cell.

With reference to the fourth aspect or any one implementation manner of the first to the fourth implementation manners of the fourth aspect, in a fifth implementation manner of the fourth aspect, the communications system is in a distributed base station networking mode and a coordinator is deployed in the communications system, base stations in the communications system are connected with the coordinator, the real scheduler corresponding to each cell is located in a base station corresponding to the cell, and the centralized virtual scheduler is located in the coordinator.

With reference to the fifth implementation manner of the fourth aspect, in a sixth implementation manner of the fourth aspect, the method further includes: sending, by the centralized virtual scheduler, a measurement request message to a real scheduler of a third cell in a downlink receive frame number and subframe number; receiving, by the centralized virtual scheduler in an uplink transmit frame number and subframe number, a measurement response message sent by the real scheduler of the third cell, where a round trip time (RTT) of the real scheduler of the third cell is a largest RTT in the multiple cells in the communications system, and the RTT indicates a difference between the uplink transmit frame number and subframe number and the downlink receive frame number and subframe number; and determining, by the centralized virtual scheduler, a start time according to the RTT of the real scheduler corresponding to the third cell, and sending the start time to the real scheduler corresponding to the first cell, so that the real scheduler corresponding to the first cell schedules the user equipment at the start time.

With reference to the fourth aspect or any one implementation manner of the first to the fourth implementation manners of the fourth aspect, in a seventh implementation manner of the fourth aspect, baseband processing units (BBUs) of the communications system are placed together, the real scheduler corresponding to each cell in the multiple cells is located in a BBU corresponding to the cell, and the centralized virtual scheduler is located in any BBU of the BBUs that are placed together.

A fifth aspect provides a scheduling method, where the method is applicable to a communications system that includes multiple cells, the communications system includes a centralized virtual scheduler and at least one real scheduler, each cell in the multiple cells corresponds to one real scheduler, and the method includes: receiving, by a real scheduler of a first cell, transmit power that is of the first cell and determined by the centralized virtual scheduler, where the first cell is each cell in the multiple cells in the communications system; and scheduling, by the real scheduler, user equipment in the first cell by using the transmit power determined by the centralized virtual scheduler.

With reference to the fifth aspect, in a first implementation manner of the fifth aspect, the receiving, by a real scheduler of a first cell, transmit power that is of the first cell and determined by the centralized virtual scheduler includes: receiving, by the real scheduler, transmit power that is on each resource block (RB) unit of the first cell and determined by the centralized virtual scheduler, where the RB unit includes a physical resource block (PRB) or a resource block group (RBG); and the scheduling, by the real scheduler, user equipment in the first cell by using the transmit power determined by the centralized virtual scheduler includes: scheduling, by the real scheduler, the user equipment on each RB unit of the first cell by using the transmit power determined by the centralized virtual scheduler.

With reference to the fifth aspect or the first implementation manner of the fifth aspect, in a second implementation manner of the fifth aspect, the method further includes: receiving, by the real scheduler, a load balancing result sent by the centralized virtual scheduler, where the load balancing result is that the first cell schedules edge user equipment of a second cell, and the first cell and the second cell are neighboring cells in the multiple cells and are located in a same cluster; and scheduling, by the real scheduler, the edge user equipment of the second cell according to the load balancing result.

With reference to the fifth aspect or the first or the second implementation manner of the fifth aspect, in a third implementation manner of the fifth aspect, the communications system is in a distributed base station networking mode and a coordinator is deployed in the communications system, base stations in the communications system are connected with the coordinator, the real scheduler corresponding to each cell in the multiple cells is located in a base station corresponding to the cell, and the centralized virtual scheduler is located in the coordinator.

With reference to the third implementation manner of the fifth aspect, in a fourth implementation manner of the fifth aspect, the method further includes: receiving, by the real scheduler in a downlink receive frame number and subframe number, a measurement request message sent by the centralized virtual scheduler; sending, by the real scheduler in an uplink transmit frame number and subframe number, a measurement response message to the centralized virtual scheduler, so that the centralized virtual scheduler obtains a round trip time (RTT) of the real scheduler according to the uplink transmit frame number and subframe number and the downlink receive frame number and subframe number, select a largest RTT from all RTTs of the multiple cells in the communications system, and determine a start time according to the largest RTT, where the RTT indicates a difference between the uplink transmit frame number and subframe number and the downlink receive frame number and subframe number; and receiving the start time sent by the centralized virtual scheduler, and scheduling the user equipment at the start time.

With reference to the fifth aspect or the first or the second implementation manner of the fifth aspect, in another implementation manner of the fifth aspect, baseband processing units (BBUs) of the communications system are placed together, the real scheduler corresponding to each cell in the multiple cells is located in a BBU corresponding to the cell, and the centralized virtual scheduler is located in any BBU of the BBUs that are placed together.

The scheduling methods according to the embodiments of the present application are applicable to a communications system that includes multiple cells, where the communications system includes an upper-layer centralized virtual scheduler and at least one lower-layer real scheduler; the centralized virtual scheduler determines transmit power of each cell in the multiple cells, and sends the transmit power of each cell to a real scheduler of the cell, so as to instruct the real scheduler to schedule UE in the cell by using the transmit power determined by the centralized virtual scheduler. Therefore, by using a layered scheduling architecture according to the present application, the upper-layer centralized virtual scheduler performs comprehensive coordination on the transmit power of the multiple cells, so as to instruct the lower-layer real scheduler to schedule the UE by using the transmit power coordinated by the centralized virtual scheduler. This can reduce inter-cell interference and improve overall network performance.

BRIEF DESCRIPTION OF DRAWINGS

To describe the technical solutions in the embodiments of the present application more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIG. 14 is a schematic block diagram of layered scheduling for load balancing coordination according to another embodiment of the present application;

FIG. 15 is a flowchart of a scheduling method according to an embodiment of the present application;

DESCRIPTION OF EMBODIMENTS

Figure 1:
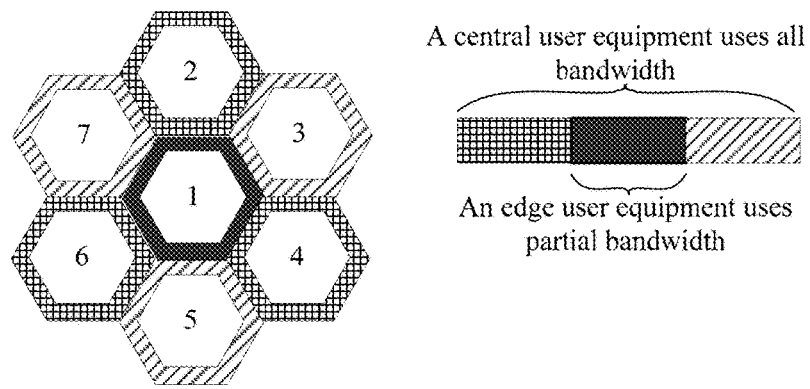
FIG. 1 is a schematic diagram of an existing method for coordinating spectrum resources.

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

It should be understood that, the technical solutions of the embodiments of the present application may be applied to various communications systems, such as: a GSM (Global System for Mobile Communications), a CDMA (Code Division Multiple Access) system, a WCDMA (Wideband Code Division Multiple Access) system, a GPRS (general packet radio service) system, an LTE system, an LTE FDD (frequency division duplex) system, an LTE TDD (time division duplex) system, a UMTS (Universal Mobile Telecommunications System). It should be understood that the present application is not limited thereto.

In the embodiments of the present application, UE (user equipment) may also be referred to as a terminal, an MS (mobile station), a mobile terminal, and the like. The user equipment may communicate with one or more core networks through a RAN (radio access network). For example, the user equipment may be a mobile phone (or referred to as a "cellular" phone), or a computer with a mobile terminal; for example, the user equipment may be a portable, pocket-sized, handheld, computer built-in, or vehicle-mounted mobile apparatus.

A base station may be a BTS (base transceiver station) in GSM or CDMA, or may be an NB (NodeB) in WCDMA, or a BS (base station) in UMTS, or may be an eNodeB (evolved NodeB) in LTE, which is also called eNB, which is not limited in the present application.

In the embodiments of the present application, connections between one component and another (for example, between subsystems or modules in the present application) may include wired and/or wireless connections. A wired connection may include but is not limited to cables formed by various media, for example, an optical fiber, a conductive cable, a semiconductor line; or a wired connection may include other forms, such as an internal bus, a circuit, and a backplane. A wireless connection is a connection capable of implementing wireless communication, including but not limited to radio frequency, infrared, Bluetooth, and the like. An internal or external interface may exist between two components, where the interface may be a physical or logical interface.

The following description uses an LTE network as an example. In an LTE single-frequency network, interference exists between neighboring cells. At present, an ICIC (inter-cell interference coordination) technology may be used to reduce inter-cell interference. The basic idea of ICIC is to limit resource utilization in a manner of coordination between cells, which includes limiting available time-frequency resources or limiting transmit power on a time-frequency resource. For example, from a perspective of coordination, the interference coordination technology may be divided into frequency-domain coordination and time-domain coordination. The frequency-domain coordination may be implemented by allocating different edge bands to different cells, and the time-domain coordination may be implemented by configuring transmit power of each TTI (transmission time interval) of each cell.

For example, a method for coordinating spectrum resources is schematically shown in FIG. 1, where the frequency resources are divided into three portions. User equipment at a center of a cell may use all frequency resources, but user equipment at an edge of a cell may use only some frequency resources; moreover, frequency resources used by user equipments at cell edges of neighboring cells are different, so as to reduce interference on the user equipments at the cell edges.

Figure 2:
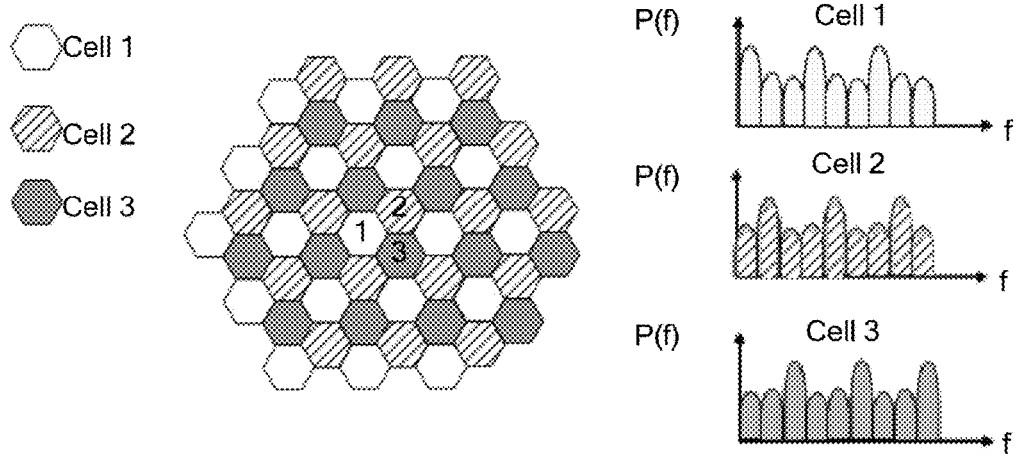
FIG. 2 is a schematic diagram of an existing method for coordinating power resources.

For another example, a method for coordinating power resources is schematically shown in FIG. 2, where frequency resources are divided into three portions. All cells may use all the frequency resources; however, only some frequencies are allowed to use high transmit power in different types of cells. For example, user equipment at a cell edge may use these frequencies, and frequency sets vary with cell types, so as to reduce interference on the user equipment at the cell edge.

The foregoing coordination solutions are not flexible enough and can hardly meet a requirement that utilization of frequency resources for each cell is adjusted according to a status of a live network, resulting in low resource utilization efficiency. In addition, the foregoing coordination solutions are cell-level coordination, which is not specific enough for resolving a problem of inter-cell interference and has a relatively coarse granularity.

In view of this, the embodiments of the present application provide a layered scheduling architecture, which includes an upper-layer centralized virtual scheduler and a lower-layer real scheduler. The upper-layer centralized virtual scheduler may collect information reported by UEs in all cells within a control range, perform virtual scheduling by using the information, and estimate a change in network performance after a change in transmit power of a cell, so as to select and deliver transmit power that ensures optimal network performance and instruct the lower-layer real scheduler to schedule UE according to the optimal transmit power. It can be seen that this layered architecture may adjust utilization of frequency resources for each cell according to a status of a live network, so as to improve resource utilization efficiency.

In addition, the centralized virtual scheduler may further determine transmit power on each RB (resource block) unit of each cell, and then instruct the real scheduler to perform real scheduling on each RB unit according to the transmit power determined by the centralized virtual scheduler. It can be seen that RB-level power coordination may also be implemented by using the layered scheduling architecture, so that a coordination granularity is finer, which further helps resolve the problem of inter-cell interference. The RB unit mentioned herein may be one PRB (physical resource block), or an RBG (resource block group) including several PRBs.

Figure 3:
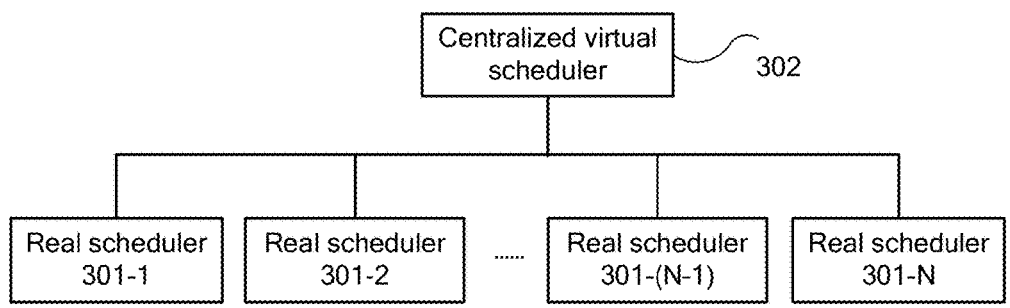
FIG. 3 is a schematic block diagram of a scheduling system according to an embodiment of the present application.

Referring to FIG. 3, FIG. 3 is a schematic block diagram of a scheduling system according to an embodiment of the present application. The scheduling system 300 is configured to coordinate resource utilization of multiple cells, so as to reduce inter-cell interference; moreover, the scheduling system 300 includes at least one real scheduler and a centralized virtual scheduler 302. The centralized virtual scheduler 302 is configured to determine transmit power of each cell, and send the transmit power of each cell to a real scheduler of the cell. The real scheduler of each cell is configured to schedule UE in the cell by using the transmit power determined by the centralized virtual scheduler 302.

Further, the centralized virtual scheduler 302 may determine transmit power at a finer granularity, that is, determine transmit power on each RB (resource block) unit of each cell, where the RB unit includes a PRB or an RBG; and send a transmit power determining result to the real scheduler of each cell, so as to instruct the real scheduler to schedule UE on each PRB or RBG of the cell by using the transmit power determined by the centralized virtual scheduler 302. In this way, RB-level power coordination may be implemented, so that a coordination granularity is finer, which further helps resolve a problem of inter-cell interference.

It should be noted that, the foregoing centralized virtual scheduler and real scheduler may also be respectively referred to as a centralized virtual scheduling entity and a real scheduling entity, and may be functional entities or logical entities. That is, they may be in a software form and their functions are implemented by using a processor to execute program code; or they may be in a hardware form, for example, be placed on a baseband processing board as a chip or an application specific integrated circuit.

FIG. 3 provides an example of N real schedulers, which are a real scheduler 301-1, a real scheduler 301-2, . . . , a real scheduler 301-(N−1), and a real scheduler 301-N, where N is a positive integer. The centralized virtual scheduler 302 is separately connected to the N real schedulers. It should be understood that, in this embodiment of the present application, the number of real schedulers is not limited and may be one or more than one. Moreover, each real scheduler may schedule one or more cells. For example, one real scheduler may be placed on one base station, and all cells served by the base station may be scheduled by the real scheduler. Alternatively, multiple real schedulers separately corresponding to multiple cells may be placed on a base station that serves the multiple cells.

A process in which the centralized virtual scheduler 302 determines the transmit power of each cell or the transmit power on each RB unit of each cell may be a virtual scheduling (or referred to as pre-scheduling) process with power traversed. For example, the centralized virtual scheduler collects information about all cells within a control range, and calculates a utility value (or referred to as a performance value) of a current network according to the information; and estimates, according to information about each cell, a change in network performance after the transmit power of a cell is changed, and selects and delivers transmit power with optimal utility. The information about the cell may include channel information and historical scheduling information of the cell. The channel information may be downlink channel information, for example, measurement information reported by UE, and may also be uplink channel information, for example, measurement information obtained by each cell by measuring an uplink reference signal sent by UE in one cell.

Specifically, the process in which the centralized virtual scheduler determines the transmit power of each cell includes: obtaining channel information and historical scheduling information of multiple cells; and calculating network utility values of each cell under multiple power candidates according to the obtained channel information and historical scheduling information, and selecting a power candidate with an optimal network utility value as transmit power of the cell for which calculation is currently performed; or calculating network utility values of each RB unit of each cell under multiple power candidates according to the obtained channel information and historical scheduling information, and selecting a power candidate with an optimal network utility value as transmit power of the RB unit for which calculation is currently performed.

The multiple power candidates may be multiple power classes that are incremental at a specific power step, or multiple power classes that are set in advance. This is not limited in this embodiment of the present application.

The measurement information reported by the UE may include, for example, one or more pieces of the following information: CSI (CSI), RSRP, RSRQ, or RSSI (received signal strength indication), and the like, where the CSI includes but is not limited to a CQI, an RI, or a PMI (precoding matrix indicator). The uplink channel information obtained by the cell by means of measurement may include RSRP or RSRQ. The historical scheduling information may include a historical scheduling priority, a scheduling rate, transmit power at last scheduling, and the like. The network utility value may be represented by using a total utility function, where the total utility function may be summation of logarithms of scheduling rates of all UEs, or the sum of average scheduling priorities of all cells. The optimal utility may refer to that the weighted sum of the scheduling rates of all the UEs is the largest, or the sum of average scheduling priorities of the cells is the smallest, or the like. In addition, the transmit power may be changed in a manner in which power is increased for all the cells at a same ratio, or in a manner in which power is increased for one cell.

In summary, the present application does not limit a virtual scheduling algorithm of the centralized virtual scheduler. A person skilled in the art may select different algorithms according to requirements as long as a power combination that ensures optimal network performance can be selected from multiple power combinations.

Figure 4:
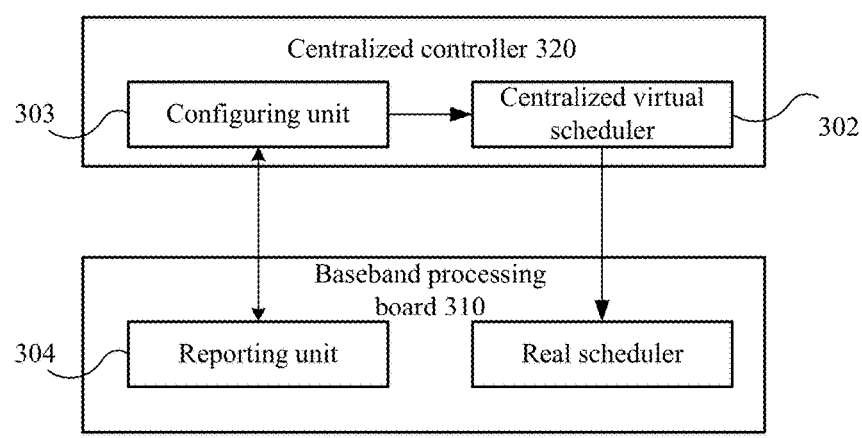
FIG. 4 is a schematic block diagram of a scheduling system according to another embodiment of the present application.

It should be noted that, reporting of the information about the cells may be configured in advance. For example, as another embodiment of the present application, the system 300 may further extend its functions and include a configuring unit 303. The configuring unit 303 may be configured to configure reported content and reporting period of information about a cell. Moreover, a person skilled in the art may adjust the reported content and the reporting period, so as to meet requirements of different scenarios. Referring to FIG. 4, in this embodiment, for ease of description, only one real scheduler is shown, and the real scheduler is located in a baseband processing board 310 of a base station; the baseband processing board 310 is connected to a centralized controller 320, and the centralized virtual scheduler 302 and the configuring unit 303 are placed in the centralized controller 320. The configuring unit 303 is configured to configure information that is about a cell and reported by the baseband processing board 310, for example, reported content and reporting period. In this case, one reporting unit 304 may be placed on the baseband processing board 310 and be configured to store information reported by UE, historical scheduling information, and some other information, such as CSI, RSRP, a scheduling priority, an MCS (modulation and coding scheme), and a neighboring relation table. In this way, when a reporting period is due, the reporting unit 304 may report corresponding information according to configuration performed by the configuring unit 303, so that the centralized virtual scheduler 302 determines transmit power of a corresponding cell.

It should be noted that, the centralized controller 320 may be located in another baseband processing board of the base station, in a baseband processing board of another base station, or on a network node (hereinafter referred to as a coordinator (eCoordinator, ECO) that is separately deployed, where the network node is configured to manage multiple distributed base stations in a centralize manner and is connected with these distributed base stations by using an IP (Internet Protocol) network.

In view of a constraint of computation complexity, when a network reaches a certain scale, cells on the network need to be grouped into clusters according to a computation capability, an interference condition, and the like, so that inter-cluster interference may be minimized and intra-cluster interference may be relatively focused. One centralized virtual scheduler may be set for each cluster to perform transmit power coordination between cells.

Figure 5:
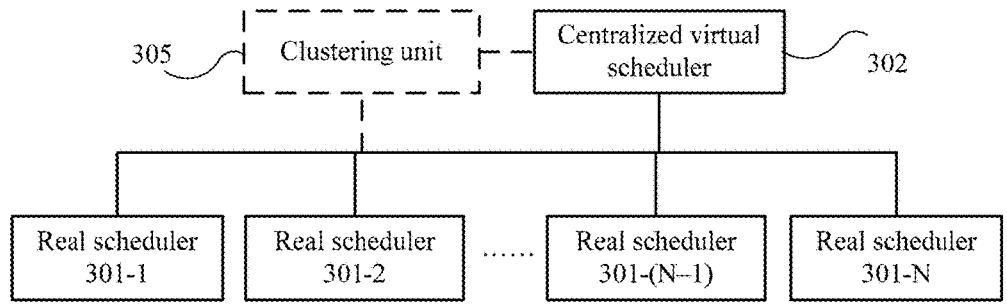
FIG. 5 is a schematic block diagram of a scheduling system according to another embodiment of the present application.

The description of the foregoing embodiment is about scheduling that is performed on multiple cells in one cluster. For scheduling of cells in each cluster, reference may be made to the description of the foregoing embodiments. When cells in a communications system are grouped into one cluster, only one centralized virtual scheduler may be set. When the cells in the communications system are grouped into multiple clusters, one subunit may be set for each cluster, where each subunit is configured to determine transmit power of cells in a corresponding cluster. That is, the centralized virtual scheduler determines transmit power of each cell in each cluster on a cluster-by-cluster basis. As another embodiment of the present application, the system 300 may further extend its functions. Referring to FIG. 5, in this embodiment, the system 300 may further include a clustering unit 305. The clustering unit 305 is configured to group multiple cells in a communications system into at least one cell cluster, for example, M cell clusters, where M is a positive integer, and send information about the M cell clusters obtained after the grouping to the centralized virtual scheduler 302; the centralized virtual scheduler 302 may be configured to determine transmit power of each cell on a cluster-by-cluster basis; or in a case in which each cluster corresponds to one subunit of the centralized virtual scheduler, each subunit determines transmit power on each RB of each cell in a corresponding cluster. Preferably, one cell cluster includes not more than 36 cells.

Optionally, when a communications network has many cells, for example, when the number of cells in the communications system is greater than a threshold, the clustering unit 305 may be configured to group multiple cells in the communications system into multiple cell clusters.

Optionally, the clustering unit 305 may be further configured to determine a value of interference between any two cells in multiple cells according to information reported by a reporting unit of each cell, and group the multiple cells into M cell clusters according to the value of the interference between the any two cells in the multiple cells, where the cells may be periodically and dynamically grouped into clusters.

In this case, multiple cells in a communications network are grouped into at least one cell cluster according to a condition of inter-cell interference, where multiple cells that have serious interference are grouped into a same cell cluster, and coordination is performed on resource utilization of the multiple cells in the same cell cluster, which implements power optimization on the cells in the cluster and prevents downlink inter-cell interference.

It should be understood that this embodiment of the present application does not limit a manner of grouping cells into clusters, where cells may be groups into clusters by number or location.

It should be noted that, the configuring unit, the reporting unit, and the clustering unit may be functional entities or logical entities. That is, they may be in a software form and their functions are implemented by using a processor to execute program code; or they may be in a hardware form, for example, their functions are implemented as a chip or an application specific integrated circuit.

In addition to CSPC (Coordinated Scheduling Power Control, coordinated scheduling power control) scheduling, as another embodiment of the present application, the system 300 may further extend its function. The system 300 may be further configured to coordinate load balancing of multiple cells, which is referred to as CLB (coordinated load balancing) scheduling. Optionally, CLB virtual scheduling may be implemented by the foregoing centralized virtual scheduler 302, and CLB real scheduling may be implemented by the foregoing real scheduler. For example, the centralized virtual scheduler may be configured to determine a load balancing result; the centralized virtual scheduler sends the load balancing result to a real scheduler of a first cell in multiple cells, so as to instruct the real scheduler to schedule edge user equipment of a second cell, where the first cell and the second cell are neighboring cells and are located in a same cluster. Certainly, the CLB virtual scheduling and the CSPC virtual scheduling may be separately implemented by different centralized virtual schedulers; similarly, the CLB real scheduling and the CSPC real scheduling may be separately implemented by different real schedulers. This embodiment of the present application sets no limit thereto. For the purpose of distinguishing between scheduling apparatuses, in the following examples, an apparatus for implementing a CSPC virtual scheduling function is referred to as a first centralized virtual scheduler, and an apparatus for implementing a CLB virtual scheduling function is referred to as a second centralized virtual scheduler. It should be noted that, the first centralized virtual scheduler and the second centralized virtual scheduler are merely a logical function division, and may be combined or integrated into one physical entity or be physically separate and placed on different network devices in actual implementation.

Optionally, the second centralized virtual scheduler may determine a load balancing result on a cluster-by-cluster basis; or in a case in which each cluster corresponds to one second centralized virtual scheduler, the centralized virtual scheduler determines a load balancing result of each cell in a corresponding cluster. For an example of grouping cells into clusters, reference may be made to the embodiment shown in FIG. 5, and the details are not described herein again.

Optionally, the second centralized virtual scheduler may be configured to coordinate load balancing according to load information of each cell. The second centralized virtual scheduler may be further configured to determine a priority of each cell in the multiple cells according to the load information of each cell, and configure that the first cell in the multiple cells schedules edge user equipment of a second cell, where the first cell and the second cell are neighboring cells and a priority of the second cell is higher than a priority of the first cell. A higher cell priority indicates heavier cell load. Optionally, CLB virtual scheduling may be periodically performed. Specifically, the sum of priorities of all cells in a cluster is determined as a target function within each period, where the greater differences between the priorities of the cells are, the larger the target function is; a cell (for example, the second cell is a heavily loaded cell, and the first cell is a lightly loaded cell, which causes a great difference between priorities of the two cells) that makes the target function be the largest may be first selected to configure scheduling of edge user equipment. The priority of the cell is affected by changing the cell that schedules the edge user equipment, which implements load balancing of cells, so as to improve coverage performance of a network.

Optionally, as another embodiment, when the communications system is in a distributed base station networking mode and a coordinator is deployed, base stations in the communications system are connected with the coordinator, the real scheduler of each cell may be located in a base station corresponding to the cell, and the centralized virtual scheduler may be located in the coordinator; or when baseband processing units (BBUs) of base stations in the communications system are placed together (Cloud BB), the real scheduler of each cell may be located in a BBU corresponding to the cell, and the centralized virtual scheduler may be located in any BBU of the BBUs that are placed together.

Figure 6:
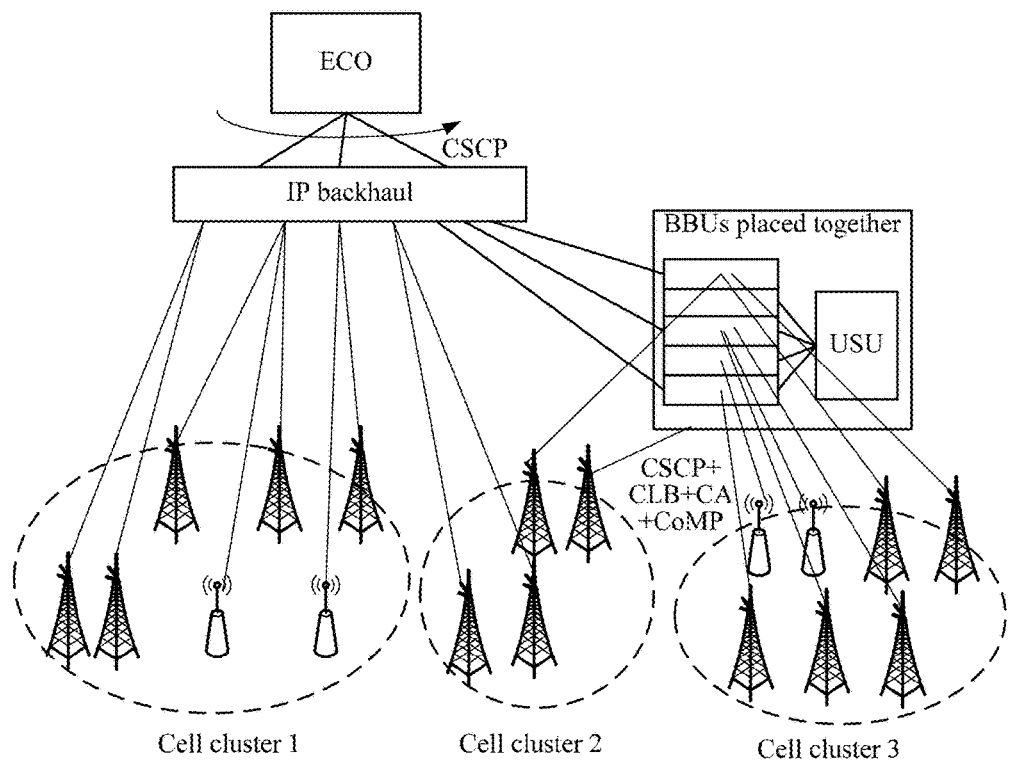
FIG. 6 is a schematic diagram of a scenario of a communications network that is applicable to an embodiment of the present application.

Specifically, in a network scenario shown in FIG. 6, distributed base stations are connected with an ECO through an IP backhaul; a real scheduler of each cell is located in a base station corresponding to the cell; optionally, a reporting unit of each cell may be located in the base station corresponding to the cell. A first centralized virtual scheduler is deployed on the ECO to perform CSPC virtual scheduling; optionally, a clustering unit may be deployed on the ECO, or a configuring unit may be further deployed. In this scenario, coordination is performed on resource utilization of multiple cells in two cell clusters, which are cells in a cell cluster 1 and some cells in a cell cluster 2. In another networking scenario of Cloud BB, BBUs of base stations on a network are placed together (Cloud BB) and are connected with a USU (universal switching unit), and are connected to RRUs through optical fibers. A real scheduler of each cell may be located in a BBU corresponding to the cell; optionally, a reporting unit of each cell may be located in the BBU corresponding to the cell. A first centralized virtual scheduler is deployed on one selected BBU in the Cloud BB to perform CSPC virtual scheduling; optionally, a clustering unit may be deployed on the BBU, or a configuring unit may be further deployed. Two cell clusters, which include cells of a cell cluster 3 and some cells of a cell cluster 2, are also shown in the Cloud BB scenario. In other words, CSPC virtual scheduling may be performed by the ECO and the BBU together on cells in the cell cluster 2. The ECO may implement large-scale (greater than a specific coverage area or a quantity of cells) and low-speed (for example, 20 ms to 40 ms) centralized scheduling, and the Cloud BB may implement small-scale and high-speed (for example, 1 ms to 5 ms) centralized scheduling.

It should be noted that, the scenario diagram in FIG. 6 is merely exemplary. This embodiment of the present application does not limit the number of cell clusters, the number of cells included in each cluster, the number of base stations, and the number of cells served by one base station and the number of BBUs. Regarding a type, the base station may be a macro base station, a micro base station, a picocell base station, a femtocell base station, or a home base station, where this embodiment of the present application sets no limit thereto either.

Figure 7:
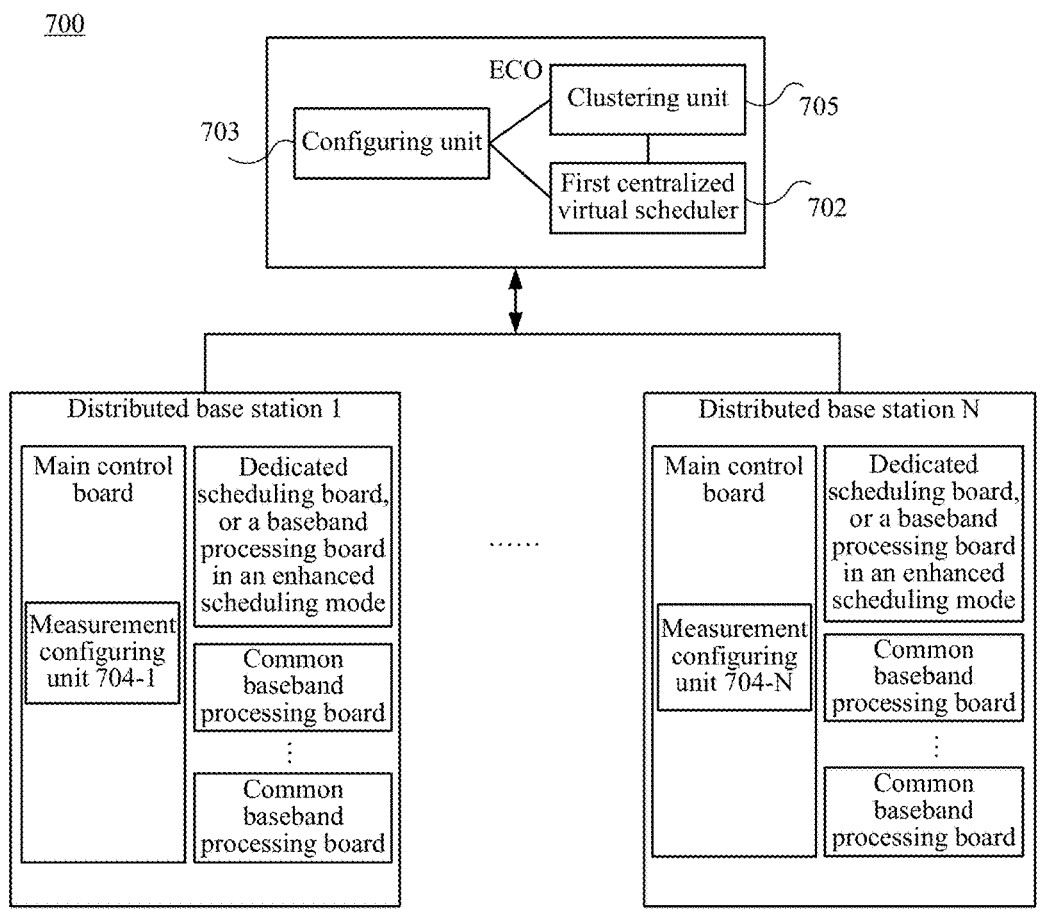
FIG. 7 is a schematic block diagram of a scheduling system according to another embodiment of the present application.

In a case in which a coordinator performs CSPC virtual scheduling, optionally, a schematic diagram of a scheduling system is shown in FIG. 7. In this figure, an ECO includes a first centralized virtual scheduler 702, a configuring unit 703, and a clustering unit 705; a real scheduler of each cell may be located in a baseband processing board (not shown) of a base station corresponding to the cell; a measurement configuring unit may be deployed on each distributed base station (which may be, for example, a main control board of the base station), where the measurement configuring unit may be configured to send measurement configuration information to user equipments of cells served by the base station, so that the user equipments measure a downlink reference signal according to the measurement configuration information; the measurement configuring unit may be further configured to receive information reported by user equipment; and the measurement configuring unit may further implement a function of the foregoing reporting unit. The measurement configuring unit may be configured to measure uplink reference signals of the user equipments of the cells served by the base station, and may be further configured to determine interference information and report the interference information to the first centralized virtual scheduler 702. The ECO is connected to the distributed base stations.

In the case in which the coordinator performs the CSPC virtual scheduling, CSPC has a high requirement for real-time quality, for example, an optimization period of CSPC is usually 20 ms to 1 s; however, processing time required by the coordinator is about 10 ms to 15 ms, and processing time required by a base station is about 2 ms, where a transmission delay is between 3 ms to 63 ms. Therefore, the transmission delay between the coordinator and the base station cannot be too long, and differences between delays between different base stations and the coordinator cannot be too large either. In order to ensure that second measurement information of cells in a cluster can arrive when the coordinator is performing virtual scheduling and that a scheduling result can become valid at air interfaces of all cells in the cluster at the same time (that is, real scheduling), synchronization between the coordinator and the base station, that is, time alignment, needs to be implemented.

Figure 8A:
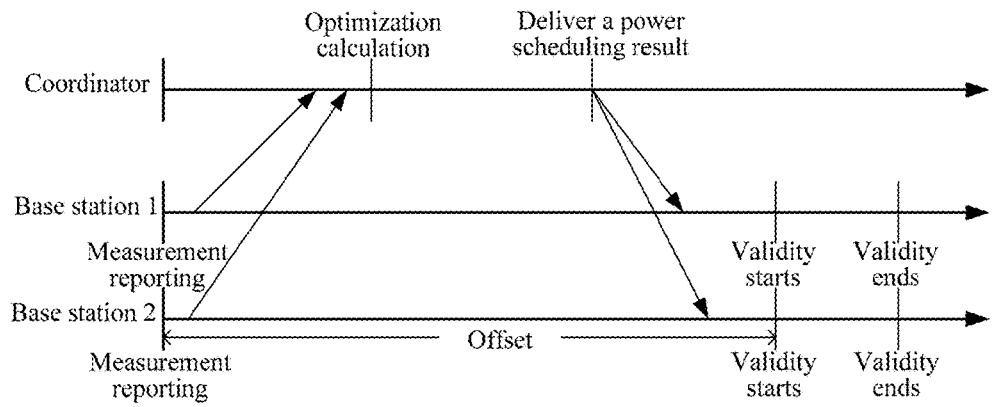
FIG. 8A is a schematic diagram of time synchronization between a coordinator and a base station according to an embodiment of the present application.

In one cluster, a transmission delay exists between a coordinator and a base station, and delays between different base stations and the coordinator are different. In order to ensure that measurement information used by the coordinator to calculate CSPC can arrive at the same time and that a power optimization result provided by the coordinator can be valid at air interfaces of all cells in the cluster at the same time, as schematically shown in FIG. 8A, the following needs be implemented:

1. Differences between transmission delays between the coordinator and all base stations are calculated.

2. Moments when the base stations upload data can be controlled, which may be distributed in a balanced manner within a controllable delay (specific buffer duration, for example, 5 ms, is required to be reserved for the base stations) to prevent a transmission peak.

3. Power calculated by the coordinator can become valid at a same frame number in a same cluster.

The following considers a manner in which a transmission delay between a base station and the coordinator is measured. A validation solution in an entire CSPC optimization period is shown in FIG. 8A, where synchronization between the coordinator and the base station is implemented by performing the following four steps:

In steps 1 and 2, time correspondences between the coordinator and the base station in both uplink and downlink directions are obtained at a delay measurement phase.

Figure 8B:
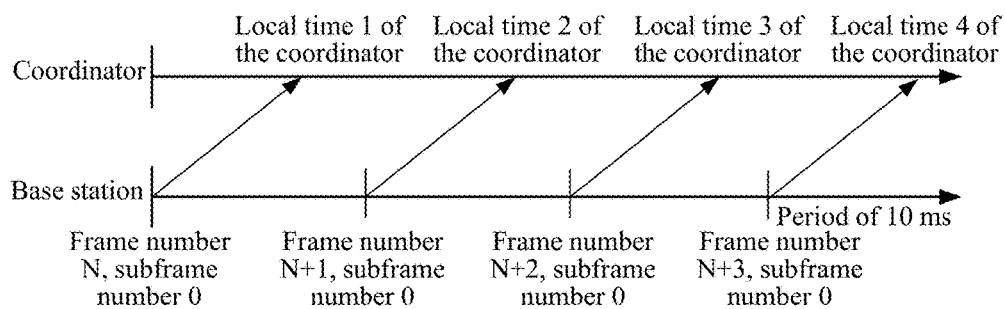
FIG. 8B is a schematic diagram of time synchronization between a coordinator and a base station according to another embodiment of the present application.

Step 1: Obtain the time correspondence between the coordinator and the base station in the uplink direction, as shown in FIG. 8B, which specifically is as follows:

1) The coordinator sends a "periodical measurement start message" to the base station, where the start message carries a period for performing measurement reporting and the number of times of measurement reporting.

2) The base station starts to periodically send a measurement response message to the coordinator, where the measurement response message carries "frame number+subframe number" that are at a moment when the base station sends the measurement response message.

3) When receiving the measurement response message from the base station, the coordinator obtains local time of the coordinator, so as to obtain time correspondence between the base station and the coordinator.

4) In order to overcome impact of a delay variation, after measurement reporting is performed N times, the coordinator obtains one stable uplink time correspondence.

5) Each base station performs measurement one time to obtain the uplink time correspondence (the local time of the coordinator, frame number N+subframe 0).

Time correspondences of all base stations are uniformed to one frame number and one subframe number, so as to facilitate subsequent comparison between different base stations.

Figure 8C:
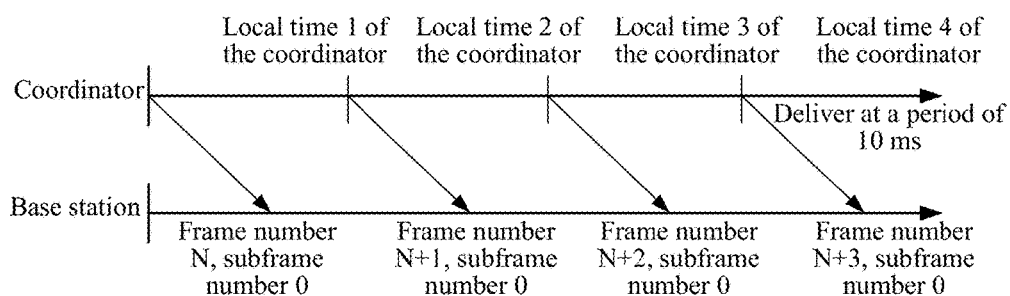
FIG. 8C is a schematic diagram of time synchronization between a coordinator and a base station according to another embodiment of the present application.

Step 2: Obtain the time correspondence between the coordinator and the base station in the downlink direction, as shown in FIG. 8C, which specifically is as follows:

1) The coordinator periodically delivers a measurement request message, which carries local time of the coordinator at a moment when the coordinator sends the measurement request message.

2) After receiving the measurement request message, the base station backfills "the local time of the coordinator" and a frame number+subframe number at a moment when the base station receives the measurement request message into a measurement response message.

3) In order to overcome impact of a delay variation, after measurement reporting is performed N times, the coordinator obtains one stable downlink time correspondence.

4) The uplink and downlink time relationships are associated to obtain an uplink-downlink time correspondence (the local time of the coordinator, uplink transmit frame N+subframe n, downlink receive frame M+subframe m), and subtraction is performed between the uplink and downlink time to obtain an RTT delay.

Step 3: Group cells into clusters.

After cells that are to be grouped into a cluster are determined, the largest RTT delay of the cells in the cluster is obtained, and an offset is obtained by using the RTT delay, where Offset=RTT delay of a base station in the cluster+ Calculation duration of the coordinator (fixed and configurable)+Delivery margin (fixed and configurable).

Step 4: Calculate a CSPC optimization period.

1) Obtain a calculation start time point by using the uplink time correspondence, start a period timer (where duration of the timer is the reporting period), and wait for a measurement report MR of the base station.

2) Obtain a power delivery time point by using the downlink time correspondence, where a time point after the CSPC calculation is completed should be earlier than the power delivery time point, so as to ensure that the delivered power may reach the base station in advance.

Optionally, the first centralized virtual scheduler 702 is configured to send a measurement request message to a real scheduler of a first cell in a downlink receive frame number and subframe number, and receive, in an uplink transmit frame number and subframe number, a measurement response message sent by the real scheduler of the first cell, where an RTT delay of the real scheduler of the first cell is the largest RTT (round trip time) delay in multiple cells, and the RTT delay indicates a difference between the uplink transmit frame number and subframe number and the downlink receive frame number and subframe number. The first centralized virtual scheduler 702 is configured to obtain, according to the uplink transmit frame number and subframe number, a start time for determining transmit power of each cell, and obtain, according to the downlink receive frame number and subframe number, a time for sending the transmit power of each cell to the real scheduler of the cell. In this way, it may be ensured that a completion time point when the coordinator performs CSPC virtual scheduling is earlier than a time point when a scheduling result is delivered, so that when real scheduling is performed on each cell in a cluster, power determined during the virtual scheduling has already reached each base station in the cluster.

Optionally, the first centralized virtual scheduler 702 may be further configured to obtain an offset according to the RTT delay of the first cell, duration (that is, duration for the coordinator to perform CSPC virtual scheduling) for the coordinator to determine transmit power of a cell, and delivery margin, and determine a clustering period of the clustering unit 705 or a virtual scheduling period of the first centralized virtual scheduler 702 according to the offset. The duration for the coordinator to perform the CSPC virtual scheduling and the delivery margin are fixed and configurable.

Specifically, a process in which the first centralized virtual scheduler 702 is configured to determine a downlink transmit frame number and subframe number may be that: the first centralized virtual scheduler 702 sends a measurement request message to real schedulers of cells in cell clusters, where the measurement request message carries a period and the number of times for reporting information; a real scheduler of each cell sends a measurement response message to the coordinator, where the measurement response message carries a frame number and subframe number at a moment when the real scheduler sends the measurement response message; when receiving the measurement response message, the first centralized virtual scheduler 702 obtains an uplink time correspondence (for example, a transmission delay) between the coordinator and the cell according to the local time of the coordinator. Optionally, in order to overcome impact of a delay variation, one stable uplink time correspondence may be obtained by performing measurement multiple times.

Similarly, a process in which the first centralized virtual scheduler 702 is configured to determine the downlink transmit frame number and subframe number may be that: the first centralized virtual scheduler 702 sends a measurement request message to the real schedulers of the cells in the cell clusters, where the measurement request message carries the local time of the coordinator; after receiving the measurement request message, the real scheduler of each cell backfills the local time of the coordinator and a frame number and subframe number at a moment when the real scheduler receives the measurement request message into a measurement response message; when receiving the measurement response message, the first centralized virtual scheduler 702 may obtain a downlink time correspondence (for example, a transmission delay) between the coordinator and the cell.

Optionally, in order to overcome impact of a delay variation, one stable uplink time correspondence may be obtained by performing measurement multiple times. A difference between the uplink transmit frame number and subframe number and the downlink receive frame number and subframe number is an RTT of the cell. As schematically shown in FIG. 8A, the sum of the largest RTT of the cell, the duration for the coordinator to perform CSPC centralized scheduling, and the delivery margin is determined as the offset.

Optionally, the first centralized virtual scheduler 702 is further configured to receive, from a control plane of each base station, information reported by cells served by the base station, where an SCTP (Steam Control Transmission Protocol) protocol is used by an interface between a control plane of the main control board and the coordinator. Alternatively, the first centralized virtual scheduler 702 is further configured to receive, from a user plane of each base station, information reported by cells served by the base station, where a GTP-U (general packet radio service Tunneling Protocol-User plane) protocol is used by an interface between a user plane of the main control board and the coordinator. It should be understood that, this embodiment of the present application does not limit a transmission protocol used by the interface between the base station and the coordinator.

Optionally, one base station may be selected from distributed base stations, and the second centralized virtual scheduler (which may also be referred to as a CLB virtual scheduler) is deployed on a dedicated baseband processing board (for example, a dedicated centralized scheduling board, or a baseband processing board in an enhanced scheduling mode) of the base station; certainly, the second centralized virtual scheduler may be deployed on a common baseband processing board. It should be understood that this embodiment of the present application sets no limit thereto.

Optionally, the real scheduler of each cell may include a downlink priority renew (DL PRI Renew) unit. Specifically, each downlink priority renew unit is configured to perform sub-band or full-band MCS (modulation and coding scheme) correction on user equipment according to downlink transmit power that is of the cell and sent by the first centralized virtual scheduler 702.

In this way, the MCS for initial transmission or retransmission scheduling is determined. That is, the downlink priority renew unit is used to perform real scheduling in each cell, and the scheduling may be periodically performed.

Figure 9:
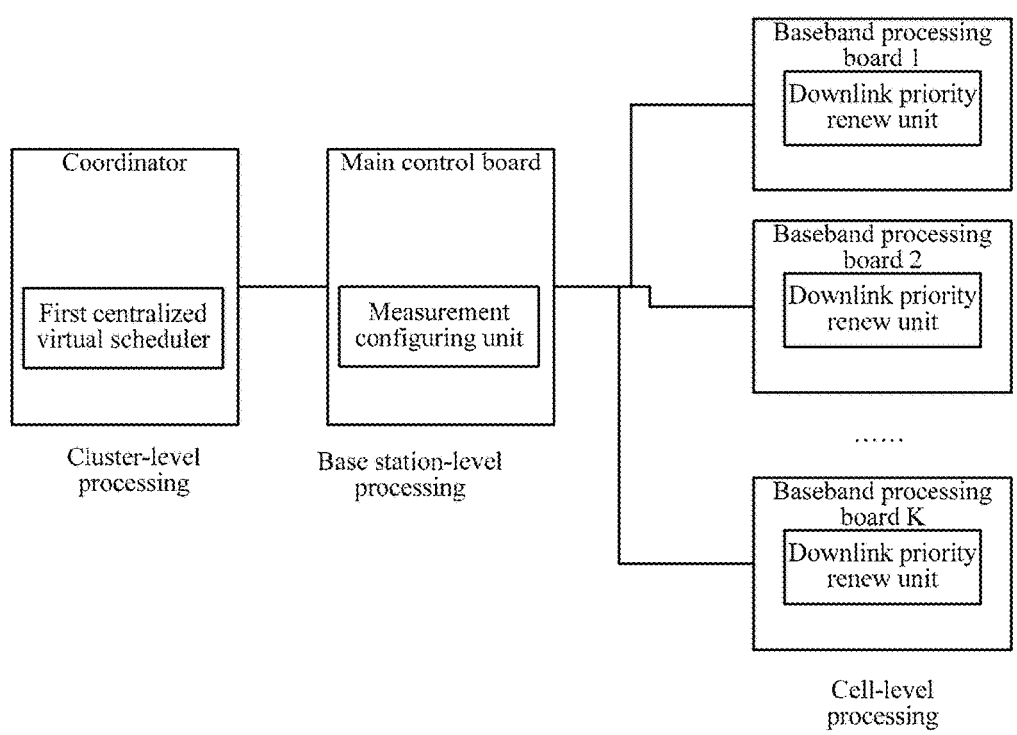
FIG. 9 is a schematic block diagram of layered scheduling and deployment for power control coordination according to an embodiment of the present application.

One base station is used as an example. As schematically shown in FIG. 9, the coordinator performs cluster-level processing, for example, performs CSPC virtual scheduling in a cell cluster; the main control board of the base station performs base station-level processing, for example, reports information or load information of a cell served by the base station; a baseband processing board performs cell-level processing, for example, performs MCS correction (which is executed by a downlink priority renew unit) on a cell or performs real scheduling such as scheduling edge user equipment of a neighboring cell (which may be executed by a DL SCH (downlink schedule) unit).

Figure 10:
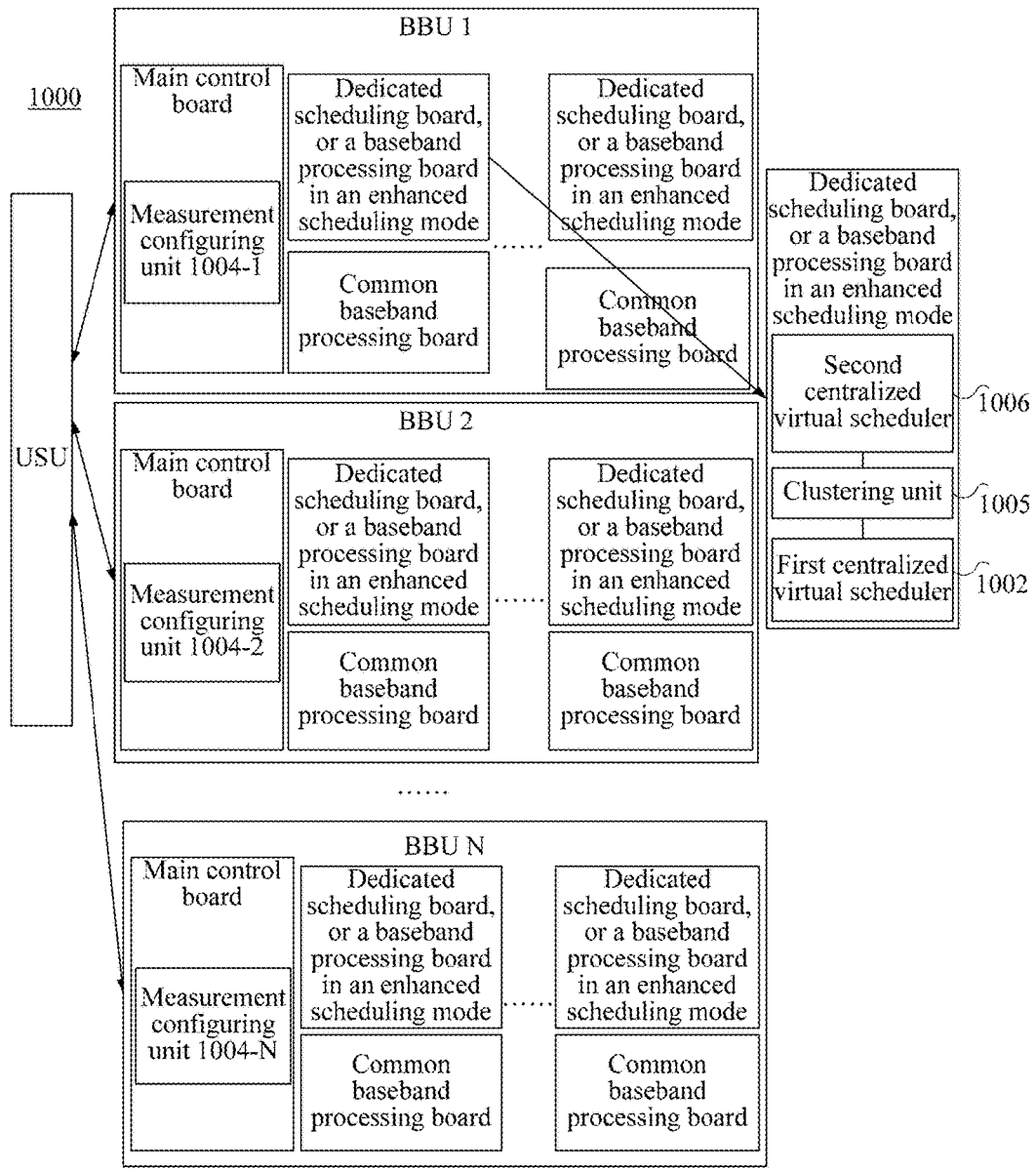
FIG. 10 is a schematic block diagram of a scheduling system according to another embodiment of the present application.

In a case in which a BBU performs CSPC virtual scheduling, for example, the foregoing Cloud BB scenario, optionally, a schematic diagram of a scheduling system is shown in FIG. 10. In this figure, a first centralized virtual scheduler 1002, a clustering unit 1005, and a second centralized virtual scheduler 1006 are deployed on a baseband processing board of a BBU, for example, a BBU 1, where the baseband processing board may be a common baseband processing board or a dedicated baseband processing board, and a real scheduler of each cell may be located in a BBU (not shown) corresponding to the cell. A measurement configuring unit is deployed on each BBU, where the measurement configuring unit may be configured to send measurement configuration information to user equipment of each cell served by the BBU, so that the user equipment measure a downlink reference signal according to the measurement configuration information; the measurement configuring unit may be further configured to receive information reported by the user equipment; and the measurement configuring unit may further implement a function of the foregoing reporting unit. The measurement configuring unit may be configured to measure a uplink reference signal sent by user equipment of each cell served by the BBU, and may be further configured to determine interference information and report the interference information to the first centralized virtual scheduler 1002.

Optionally, the first centralized virtual scheduler 1002 and the clustering unit 1005 may be both located in a common baseband processing board or a dedicated baseband processing board of a first BBU, and the measurement configuring unit may be deployed on a main control board of the BBU. Optionally, one BBU may be selected from the Cloud BB, and the second centralized virtual scheduler (which may also be referred to as a CLB virtual scheduler) is deployed on a dedicated baseband processing board (for example, a dedicated centralized scheduling board, or a baseband processing board in an enhanced scheduling mode) of the BBU; certainly, the second centralized virtual scheduler may also be deployed on a common baseband processing board. It should be understood that this embodiment of the present application sets no limit thereto.

Optionally, when the first centralized virtual scheduler 1002 is located in the common baseband processing board of the first BBU, at least one core may be reserved in the baseband processing board of the first BBU to implement a function of the first centralized virtual scheduler 1002.

Because complexity of the CSPC virtual scheduling linearly increases with the number of cells and the number of sub-bands, the CSPC virtual scheduling in a same cell cluster may be performed in parallel on a sub-band by sub-band basis. A load sharing manner of cores of the baseband processing board may specifically be that: in the case of full-band CSPC, one core in the at least one core determines downlink transmit power of each cell in a first cell cluster. In other words, load sharing is performed between the cores on a cell cluster-by-cell cluster basis, and the CSPC virtual scheduling of one cell cluster is processed by one core. Alternatively, in the case of sub-band CSPC, the at least one core may jointly determine downlink transmit power of each cell in a first cell cluster. Optionally, sharing may be performed on a sub-band by sub-band basis, each core processes a different sub-band, and when remaining resources are available, the at least one core may further jointly process another cell cluster.

Because CLB is full-band processing and complexity of CSPC centralized virtual scheduling linearly increases only with the number of cells, load sharing may be performed between cores on a cell cluster-by-cell cluster basis, and the CSPC centralized virtual scheduling of one cell cluster is processed by one core.

Figure 11:
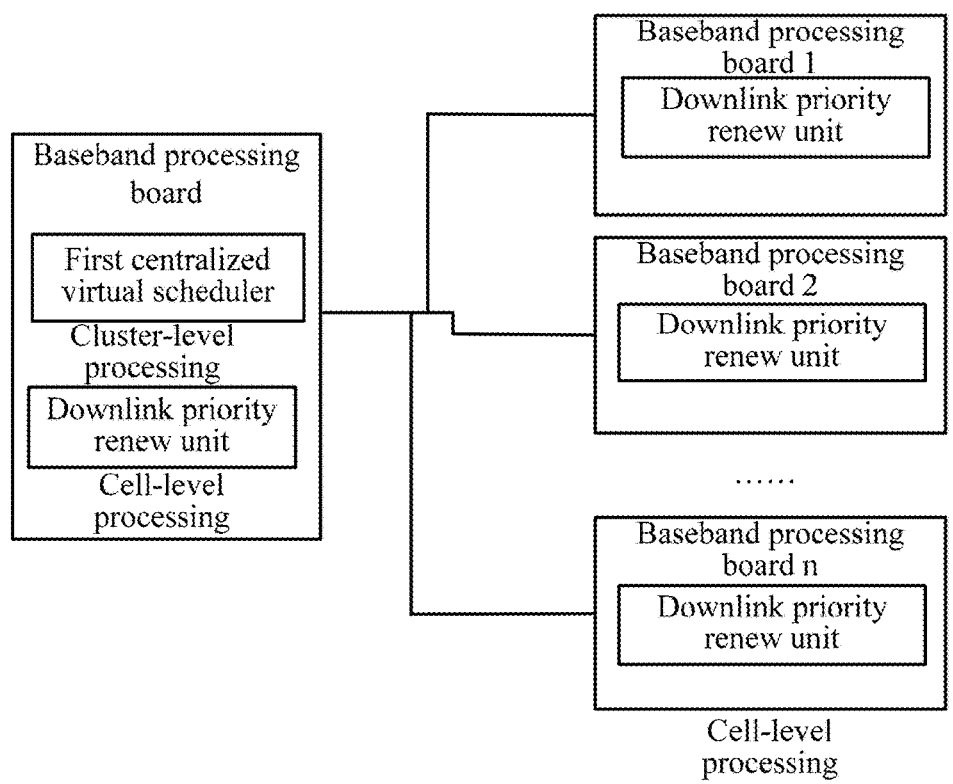
FIG. 11 is a schematic block diagram of layered scheduling for power control coordination according to an embodiment of the present application.
Figure 12:
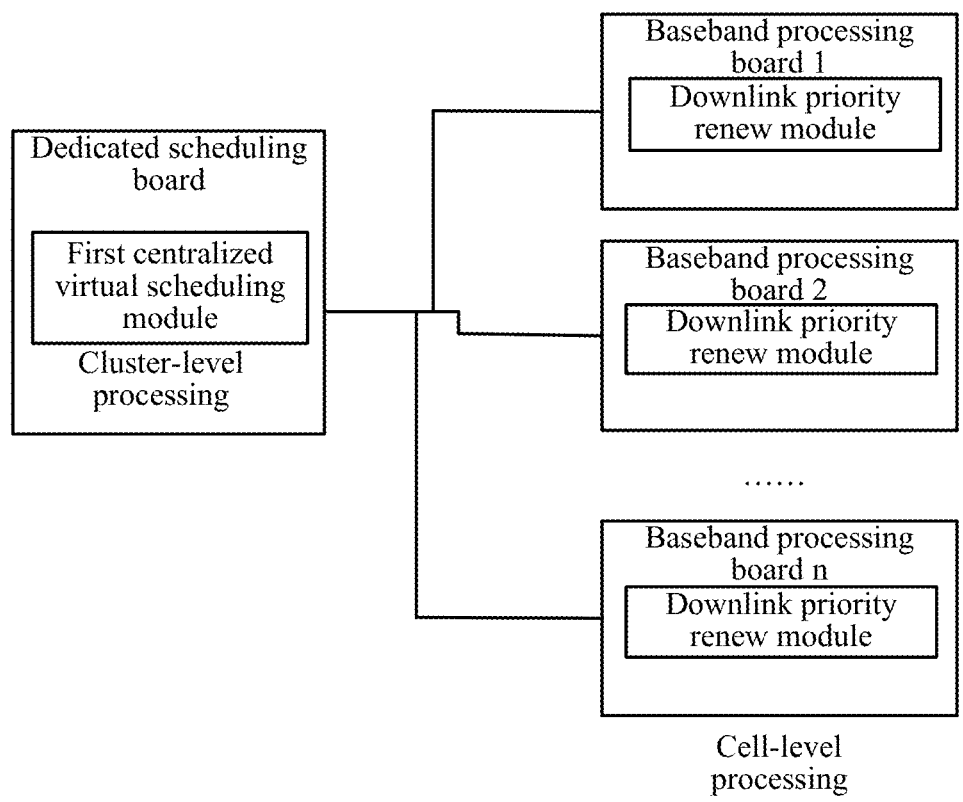
FIG. 12 is a schematic block diagram of layered scheduling for power control coordination according to another embodiment of the present application.

Optionally, the real scheduler of each cell may include a downlink priority renew unit, which is schematically shown in FIG. 11A and FIG. 12, where a first centralized virtual scheduler for performing cluster-level processing is deployed on a baseband processing board. A downlink priority renew unit is deployed on a baseband processing board of each BBU. Specifically, each downlink priority renew unit is configured to perform sub-band or full-band MCS correction on user equipment according to downlink transmit power that is of the cell and sent by the first centralized virtual scheduler 1002. In this way, the MCS for initial transmission or retransmission scheduling is determined. That is, the downlink priority renew unit is used to perform real scheduling in each cell, and the scheduling may be periodically performed.

Figure 13:
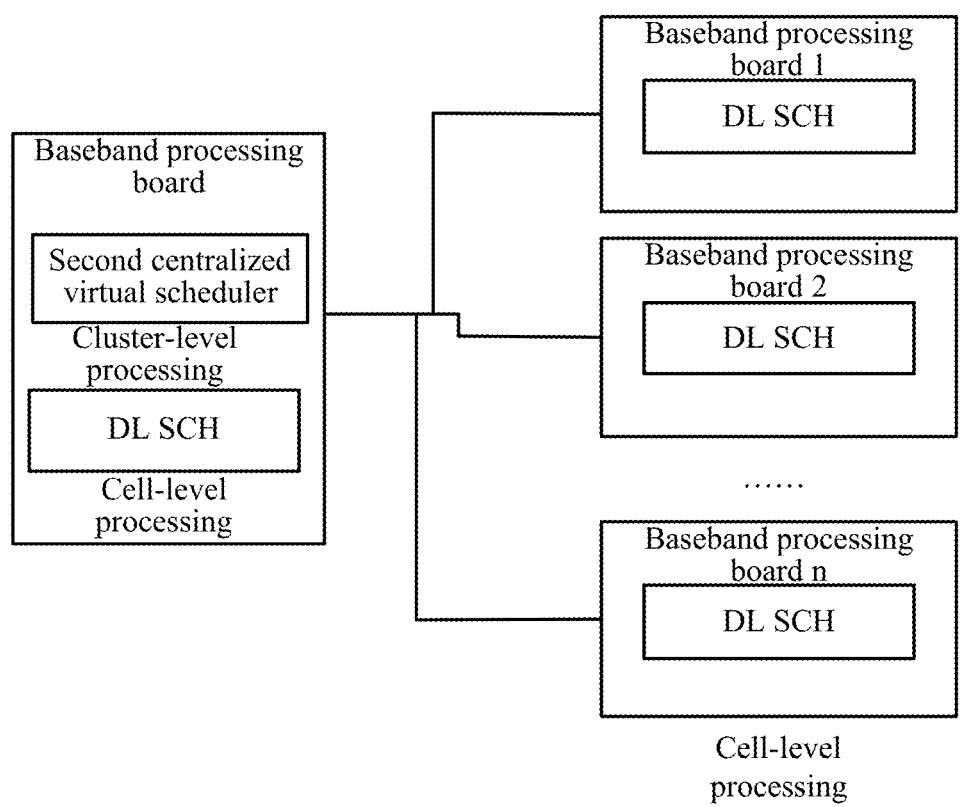
FIG. 13 is a schematic block diagram of layered scheduling for load balancing coordination according to an embodiment of the present application.

Correspondingly, the real scheduler of each cell may include a DL SCH unit. A DL SCH unit is deployed on the baseband processing board of each BBU, which is schematically shown in FIG. 13 and FIG. 14. The DL SCH unit is configured to perform CLB real scheduling, and may be configured to schedule edge user equipment of another cell according to a result that is of coordinating cell load balancing and sent by the second centralized virtual scheduler.

Based on the foregoing solution, a first centralized virtual scheduler implements power control on multiple cells by using information about the cells, so as to coordinate downlink transmit power of each cell and effectively reduce inter-cell downlink interference. In addition, a second centralized virtual scheduler implements load balancing of the cells by using load information of each cell, so as to improve coverage performance of a network.

FIG. 15 is a flowchart of a scheduling method according to an embodiment of the present application. The method is executed by a centralized virtual scheduler, is applicable to a communications system that includes multiple cells, and coordinates resource utilization of the multiple cells, so as to reduce inter-cell interference, where the communications system includes a centralized virtual scheduler and at least one real scheduler.

1501. The centralized virtual scheduler determines transmit power of a first cell, where the first cell is each cell in the multiple cells in the communications system.

1502. The centralized virtual scheduler sends the transmit power determined by the centralized virtual scheduler to a real scheduler corresponding to the first cell, so as to instruct the real scheduler corresponding to the first cell to schedule UE in the first cell by using the transmit power determined by the centralized virtual scheduler.

It should be understood that, in this embodiment of the present application, the number of real schedulers is not limited and may be one or more than one. Moreover, each real scheduler may schedule one or more cells. For example, one real scheduler may be placed on one base station, and all cells served by the base station may be scheduled by the real scheduler. Alternatively, multiple real schedulers separately corresponding to multiple cells may be placed on a base station that serves the multiple cells.

It should be noted that, the centralized virtual scheduler and the real scheduler in this embodiment of the present application may also be respectively referred to as a centralized virtual scheduling entity and a real scheduling entity, and may be functional entities or logical entities. That is, they may be in a software form and their functions are implemented by using a processor to execute program code; or they may be in a hardware form, for example, be placed on a baseband processing board as a chip or an application specific integrated circuit.

The scheduling method according to this embodiment of the present application is applicable to a communications system that includes multiple cells, where the communications system includes an upper-layer centralized virtual scheduler and at least one lower-layer real scheduler; the centralized virtual scheduler determines transmit power of each cell in the multiple cells, and sends the transmit power of each cell to a real scheduler of the cell, so as to instruct the real scheduler to schedule UE in the cell by using the transmit power determined by the centralized virtual scheduler. Therefore, by using a layered scheduling architecture according to the present application, the upper-layer centralized virtual scheduler coordinates resource utilization of the multiple cells and selects and delivers transmit power that ensures optimal network performance, so as to instruct the lower-layer real scheduler to schedule UE by using the optimal transmit power. This can reduce inter-cell interference and improve resource utilization efficiency.

The method shown in FIG. 15 may be implemented by the centralized virtual schedulers in the scheduling systems in FIG. 3 to FIG. 14, and therefore repeated description is omitted appropriately.

Optionally, as an embodiment, the centralized virtual scheduler may determine transmit power at a finer granularity. In step 1501, the centralized virtual scheduler may determine transmit power on each resource block (RB) unit of the first cell, that is, determine transmit power on each RB unit of each cell. The RB unit includes a PRB or an RBG. In step 1502, the transmit power on each RB unit of the first cell is sent to the real scheduler corresponding to the first cell, so as to instruct the real scheduler corresponding to the first cell to schedule UE on each RB unit of the first cell by using the transmit power determined by the centralized virtual scheduler. In this way, RB-level power coordination may be implemented, so that a coordination granularity is finer, which further helps resolve a problem of inter-cell interference.

In view of a constraint of computation complexity, when a network reaches a certain scale, cells on the network need to be grouped into clusters according to a computation capability, an interference condition, and the like, so that inter-cluster interference may be minimized and intra-cluster interference may be relatively focused. In this case, multiple cells on a communications network are grouped into at least one cell cluster according to a condition of inter-cell interference, where multiple cells that have serious interference are grouped into a same cell cluster, and coordination is performed on resource utilization of the multiple cells in the same cell cluster, which implements power optimization on the cells in the cluster and prevents downlink inter-cell interference.

It should be understood that this embodiment of the present application does not limit a manner of grouping cells into clusters, where cells may be groups into clusters by number or location. For an example of grouping cells into clusters, reference may be made to the foregoing description, and the details are not described herein again.

One centralized virtual scheduler may be set for each cluster to perform transmit power coordination between cells.

Optionally, as another embodiment, the centralized virtual scheduler may group the multiple cells into at least one cluster; or in step 1501, the centralized virtual scheduler determines transmit power of each cell in each cluster on a cluster-by-cluster basis. Preferably, one cell cluster includes not more than 36 cells.

Optionally, as another embodiment, in step 1501, the centralized virtual scheduler may obtain first channel information and first historical scheduling information, where the first channel information and the first historical scheduling information respectively include channel information and historical scheduling information of all cells in a cluster to which the first cell belongs. The centralized virtual scheduler calculates network utility values of the first cell under multiple power candidates according to the first channel information and the first historical scheduling information, and selects a power candidate with an optimal network utility value as the transmit power of the first cell; or the centralized virtual scheduler calculates network utility values of each RB unit of the first cell under multiple power candidates according to the first channel information and the first historical scheduling information, and select a power candidate with an optimal network utility value as transmit power of the RB unit for which calculation is currently performed. The multiple power candidates may be multiple power classes that are incremental at a specific power step, or multiple power classes that are set in advance. This is not limited in this embodiment of the present application.

Specifically, a process in which the centralized virtual scheduler determines the transmit power of each cell or the transmit power on each RB unit of each cell may be a virtual scheduling (or referred to as pre-scheduling) process with power traversed. For example, the centralized virtual scheduler collects information about all cells within a control range, and calculates a utility value (or referred to as a performance value) of a current network according to the information; and estimates, according to information about each cell, a change in network performance after the transmit power of the cell is changed, and selects and delivers transmit power with optimal utility. The information about the cell may include channel information and historical scheduling information of the cell. The channel information may be downlink channel information, for example, measurement information reported by UE, and may also be uplink channel information, for example, measurement information obtained by each cell by measuring an uplink reference signal sent by UE in one cell.

The measurement information reported by the UE may include, for example, one or more pieces of the following information: CSI, RSRP, RSRQ, or RSSI, where the CSI includes but is not limited to a CQI, an RI, or a PMI. The uplink channel information obtained by the cell by means of measurement may include RSRP or RSRQ. The historical scheduling information may include a historical scheduling priority, a scheduling rate, transmit power at last scheduling, and the like. The network utility value may be represented by using a total utility function, where the total utility function may be summation of logarithms of scheduling rates of all UEs, or the sum of average scheduling priorities of all cells. The optimal utility may refer to that the weighted sum of the scheduling rates of all the UEs is the largest, or the sum of average scheduling rates of the cells is the smallest, or the like. In addition, the transmit power may be changed in a manner in which power is increased for all the cells at a same ratio, or in a manner in which power is increased for one cell.

In summary, the present application does not limit a virtual scheduling algorithm of the centralized virtual scheduler. A person skilled in the art may select different algorithms according to requirements as long as a power combination that ensures optimal network performance can be selected from multiple power combinations.

Optionally, as another embodiment, the centralized virtual scheduler may further perform CLB virtual scheduling. Specifically, the centralized virtual scheduler may obtain first load information, where the first load information includes load information of all cells in the cluster to which the first cell belongs; determine a load balancing result according to the first load information, where the load balancing result is that the first cell schedules edge UE of a second cell, and the first cell and the second cell are neighboring cells in the cluster to which the first cell belongs. The centralized virtual scheduler sends the load balancing result to the real scheduler corresponding to the first cell, so as to instruct the real scheduler of the first cell to schedule the edge UE of the second cell.

Specifically, load balancing is coordinated according to load information of each cell. The centralized virtual scheduler may be further configured to determine a priority of each cell in the multiple cells according to the load information of each cell, and configure that the first cell in the multiple cells schedules the edge UE of the second cell, where the first cell and the second cell are neighboring cells and a priority of the second cell is higher than a priority of the first cell. A higher cell priority indicates heavier cell load. Optionally, CLB virtual scheduling may be periodically performed. Specifically, the sum of priorities of all cells in a cluster is determined as a target function within each period, where the greater differences between the priorities of the cells are, the larger the target function is; a cell (for example, the second cell is a heavily loaded cell, and the first cell is a lightly loaded cell, which causes a great difference between priorities of the two cells) that makes the target function be the largest may be first selected to configure scheduling of edge user equipment. In this way, the priority of the cell is affected by changing the cell that schedules the edge user equipment, which implements load balancing of cells, so as to improve coverage performance of a network.

It should be noted that, the functions of the centralized virtual scheduler to implement CLB virtual scheduling and CSPC virtual scheduling are merely of a logical function division, and may be combined or integrated into one physical entity or be physically separate and placed on different network devices in actual implementation. Similarly, the functions of the real scheduler to implement CLB real scheduling and CSPC real scheduling are also merely of a logical function division, and may be combined or integrated into one physical entity or be physically separate and placed on different network devices in actual implementation.

Optionally, as another embodiment, when the communications system is in a distributed base station networking mode and a coordinator is deployed, base stations in the communications system are connected with the coordinator, the real scheduler of each cell may be located in a base station corresponding to the cell, and the centralized virtual scheduler may be located in the coordinator; or when baseband processing units (BBUs) of base stations in the communications system are placed together, the real scheduler of each cell may be located in a BBU corresponding to the cell, and the centralized virtual scheduler may be located in any BBU of the BBUs that are placed together. For a diagram of a scenario of the communications system, reference may be made to FIG. 6. It should be understood that this embodiment of the present application is not limited thereto and may be further applied to another communications system.

Optionally, in a case in which the coordinator performs CSPC virtual scheduling, in order to ensure that measurement information used by the coordinator to calculate the CSPC can arrive at the same time and that a power optimization result provided by the coordinator can become valid at air interfaces of all cells in a cluster at the same time, synchronization between the coordinator and the base station, that is, time alignment, needs to be implemented.

Specifically, the centralized virtual scheduler may send a measurement request message to a real scheduler of a third cell in a downlink receive frame number and subframe number, and receive, in an uplink transmit frame number and subframe number, a measurement response message sent by the real scheduler of the third cell, where a round trip time (RTT) of the real scheduler of the third cell is a largest RTT in the multiple cells in the communications system, and the RTT indicates a difference between the uplink transmit frame number and subframe number and the downlink receive frame number and subframe number. The centralized virtual scheduler determines a start time according to the RTT of the real scheduler corresponding to the third cell, and sends the start time to the real scheduler corresponding to the first cell, so that the real scheduler corresponding to the first cell schedules UE at the start time. For a specific time synchronization process, reference may be made to the foregoing description, and the details are not described herein again.

Optionally, in a case in which the coordinator performs CSPC virtual scheduling, the centralized virtual scheduler may further receive, from a control plane of each base station, information reported by cells served by the base station, where an SCTP protocol is used by an interface between a control plane of a main control board and the coordinator. Alternatively, the centralized virtual scheduler may further receive, from a user plane of each base station, information reported by cells served by the base station, where a GTP-U protocol is used by an interface between a user plane of a main control board and the coordinator. It should be understood that, this embodiment of the present application does not limit a transmission protocol used by the interface between the base station and the coordinator.

Optionally, one base station may be selected from distributed base stations, and the CLB virtual scheduling function is deployed on a dedicated baseband processing board (for example, a dedicated centralized scheduling board, or a baseband processing board in an enhanced scheduling mode) of the base station. That is, functional entities for CSPC virtual scheduling and CLB virtual scheduling may be distributed on different network devices.

Optionally, in a case in which a BBU performs CSPC virtual scheduling, the centralized virtual scheduler may be deployed on a common baseband processing board or a dedicated baseband processing board of a first BBU, and the real scheduler of each cell may be located in a baseband processing board of a BBU corresponding to the cell. When the centralized virtual scheduler is located in the common baseband processing board of the first BBU, at least one core may be reserved in the baseband processing board of the first BBU to implement a function of the centralized virtual scheduler. Because complexity of the CSPC virtual scheduling linearly increases with the number of cells and the number of sub-bands, the CSPC virtual scheduling in a same cell cluster may be performed in parallel on a sub-band by sub-band basis. A load sharing manner of cores of the baseband processing board may specifically be that: in the case of full-band CSPC, one core in the at least one core determines downlink transmit power of each cell in a first cell cluster. In other words, load sharing is performed between the cores on a cell cluster-by-cell cluster basis, and the CSPC virtual scheduling of one cell cluster is processed by one core. Alternatively, in the case of sub-band CSPC, at least one core may jointly determine downlink transmit power of each cell in a first cell cluster. Optionally, sharing may be performed on a sub-band by sub-band basis, each core processes a different sub-band, and when remaining resources are available, at least one core may further jointly process another cell cluster. Because CLB is full-band processing and complexity of CSPC centralized virtual scheduling linearly increases only with the number of cells, load sharing may be performed between cores on a cell cluster-by-cell cluster basis, and the CSPC centralized virtual scheduling of one cell cluster is processed by one core.

Optionally, the centralized virtual scheduler deployed on the first BBU may further implement the CLB virtual scheduling function. That is, functional entities for the CSPC virtual scheduling and the CLB virtual scheduling may be integrated on one physical entity.

Optionally, the real scheduler of each cell may perform sub-band or full-band MCS correction on UE according to downlink transmit power that is of a cell and sent by the centralized virtual scheduler. In this way, the MCS for initial transmission or retransmission scheduling is determined, and real scheduling may be periodically performed.

Figure 16:
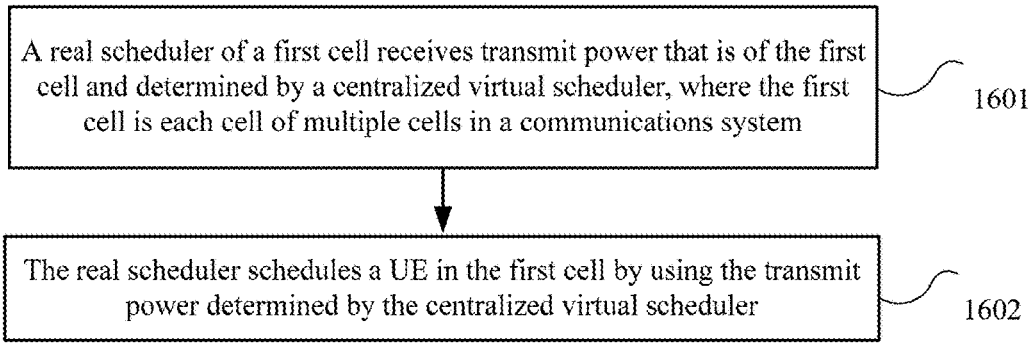
FIG. 16 is a flowchart of a scheduling method according to another embodiment of the present application.

FIG. 16 is a flowchart of a scheduling method according to another embodiment of the present application. The method is applicable to a communications system that includes multiple cells and coordinates resource utilization of the multiple cells, so as to reduce inter-cell interference, where the communications system includes a centralized virtual scheduler and at least one real scheduler. The method is executed by a real scheduler of a cell (referred to as a first cell) in the multiple cells and corresponds to the method in FIG. 15. Therefore, repeated description that is the same as the embodiment in FIG. 15 is omitted appropriately.

1601. The real scheduler of the first cell receives transmit power that is of the first cell and determined by the centralized virtual scheduler, where the first cell is each cell in the multiple cells in the communications system.

1602. The real scheduler schedules UE in the first cell by using the transmit power determined by the centralized virtual scheduler.

It should be understood that, in this embodiment of the present application, the number of real schedulers is not limited and may be one or more than one. Moreover, each real scheduler may schedule one or more cells. For example, one real scheduler may be placed on one base station, and all cells served by the base station may be scheduled by the real scheduler. Alternatively, multiple real schedulers separately corresponding to multiple cells may be placed on a base station that serves the multiple cells.

It should be noted that, the centralized virtual scheduler and the real scheduler in this embodiment of the present application may also be respectively referred to as a centralized virtual scheduling entity and a real scheduling entity, and may be functional entities or logical entities. That is, they may be in a software form and their functions are implemented by using a processor to execute program code; or they may be in a hardware form, for example, be placed on a baseband processing board as a chip or an application specific integrated circuit.

The scheduling method according to this embodiment of the present application is applicable to a communications system that includes multiple cells, where the communications system includes an upper-layer centralized virtual scheduler and at least one lower-layer real scheduler; the centralized virtual scheduler is configured to determine transmit power of each cell in the multiple cells in the communications system; and a real scheduler of a cell in the multiple cells receives transmit power that is of the cell and sent by the centralized virtual scheduler, and schedules UE in the cell by using the transmit power determined by the centralized virtual scheduler. Therefore, by using a layered scheduling architecture according to the present application, the upper-layer centralized virtual scheduler coordinates resource utilization of the multiple cells and selects and delivers transmit power that ensures optimal network performance, and the lower-layer real scheduler schedules UE by using the optimal transmit power. This can reduce inter-cell interference and improve resource utilization efficiency.

The method shown in FIG. 16 may be implemented by the real schedulers in the scheduling systems in FIG. 3 to FIG. 14, and therefore repeated description is omitted appropriately.

Optionally, as another embodiment, in step 1601, the real scheduler may receive transmit power that is on each RB unit of the first cell and sent by the centralized virtual scheduler, where the RB unit includes a PRB or an RBG. In step 1602, the real scheduler may schedule UE on each RB unit of the first cell by using the transmit power determined by the centralized virtual scheduler. In this way, RB-level power coordination may be implemented, so that a coordination granularity is finer, which further helps resolve a problem of inter-cell interference.

Optionally, as another embodiment, the real scheduler may further receive a load balancing result sent by the centralized virtual scheduler, where the load balancing result is that the first cell schedules edge UE of a second cell, where the first cell and the second cell are neighboring cells in the multiple cells and are located in a same cluster. The real scheduler may further schedule the edge UE of the second cell according to the load balancing result. Therefore, a priority of a cell is affected by changing a cell that schedules edge user equipment, which implements load balancing of cells, so as to improve coverage performance of a network.

Optionally, as another embodiment, when the communications system is in a distributed base station networking mode and a coordinator is deployed, base stations in the communications system are connected with the coordinator, the real scheduler of each cell may be located in a base station corresponding to the cell, and the centralized virtual scheduler may be located in the coordinator; or when baseband processing units (BBUs) of base stations in the communications system are placed together, the real scheduler of each cell may be located in a BBU corresponding to the cell, and the centralized virtual scheduler may be located in any BBU of the BBUs that are placed together. For a diagram of a scenario of the communications system, reference may be made to FIG. 6. It should be understood that this embodiment of the present application is not limited thereto and may be further applied to another communications system.

Optionally, in a case in which the coordinator performs CSPC virtual scheduling, in order to ensure that measurement information used by the coordinator to calculate the CSPC can arrive at the same time and that a power optimization result provided by the coordinator can become valid at air interfaces of all cells in a cluster at the same time, synchronization between the coordinator and the base station, that is, time alignment, needs to be implemented.

Specifically, the real scheduler receives, in a downlink receive frame number and subframe number, a measurement request message sent by the centralized virtual scheduler, and sends, in an uplink transmit frame number and subframe number, a measurement response message to the centralized virtual scheduler, so that the centralized virtual scheduler obtains an RTT of the real scheduler according to the uplink transmit frame number and subframe number and the downlink receive frame number and subframe number, selects a largest RTT from all RTTs of the multiple cells in the communications system, and determines a start time according to the largest RTT. The RTT indicates a difference between the uplink transmit frame number and subframe number and the downlink receive frame number and subframe number. The real scheduler receives the start time sent by the centralized virtual scheduler, and schedules the UE at the start time. In this way, it may be ensured that a completion time point when the coordinator performs CSPC virtual scheduling is earlier than a time point when a scheduling result is delivered, so that when real scheduling is performed on each cell in a cluster, power determined during the virtual scheduling has already reached each base station in the cluster. For a specific time synchronization process, reference may be made to the foregoing description, and the details are not described herein again.

Optionally, in a case in which a BBU performs CSPC virtual scheduling, the centralized virtual scheduler may be deployed on a common baseband processing board or a dedicated baseband processing board of any BBU (a first BBU), and the real scheduler of each cell may be located in a baseband processing board of a BBU corresponding to the cell. When the centralized virtual scheduler is located in the common baseband processing board of the first BBU, at least one core may be reserved in the baseband processing board of the first BBU to implement a function of the centralized virtual scheduler. Because complexity of the CSPC virtual scheduling linearly increases with the number of cells and the number of sub-bands, the CSPC virtual scheduling in a same cell cluster may be performed in parallel on a sub-band by sub-band basis. A load sharing manner of cores of the baseband processing board may specifically be that: in the case of full-band CSPC, one core in the at least one core determines downlink transmit power of each cell in a first cell cluster. In other words, load sharing is performed between the cores on a cell cluster-by-cell cluster basis, and the CSPC virtual scheduling of one cell cluster is processed by one core. Alternatively, in the case of sub-band CSPC, at least one core may jointly determine downlink transmit power of each cell in a first cell cluster. Optionally, sharing may be performed on a sub-band by sub-band basis, each core processes a different sub-band, and when remaining resources are available, at least one core may further jointly process another cell cluster. Because CLB is full-band processing and complexity of CSPC centralized virtual scheduling linearly increases only with the number of cells, load sharing may be performed between cores on a cell cluster-by-cell cluster basis, and the CSPC centralized virtual scheduling of one cell cluster is processed by one core.

Optionally, the real scheduler may perform sub-band or full-band MCS correction on UE according to downlink transmit power that is of a cell and sent by the centralized virtual scheduler. In this way, the MCS for initial transmission or retransmission scheduling is determined, and real scheduling may be periodically performed.

Figure 17:
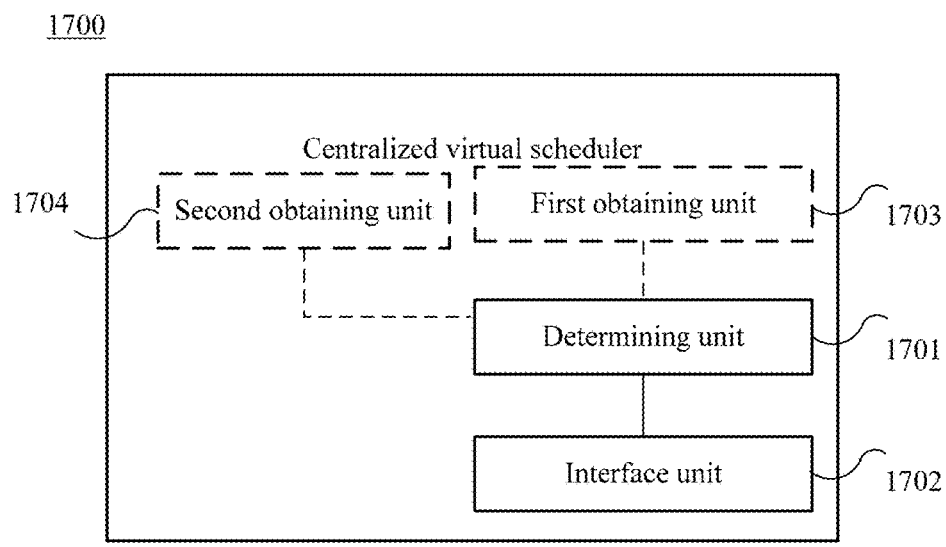
FIG. 17 is a schematic block diagram of a centralized virtual scheduler according to an embodiment of the present application.

FIG. 17 is a schematic structural diagram of a centralized virtual scheduler according to an embodiment of the present application. The centralized virtual scheduler 1700 in FIG. 17 is an example of the centralized virtual schedulers in the foregoing scheduling systems, and includes a determining unit 1701 and an interface unit 1702.

The determining unit 1701 is configured to determine transmit power of a first cell, where the first cell is each cell in multiple cells in a communications system.

The interface unit 1702 is configured to send the transmit power determined by the determining unit 1701 to a real scheduler corresponding to the first cell, so as to instruct the real scheduler corresponding to the first cell to schedule UE in the first cell by using the transmit power determined by the determining unit 1701.

It should be understood that, in this embodiment of the present application, the number of real schedulers is not limited and may be one or more than one. Moreover, each real scheduler may schedule one or more cells. For example, one real scheduler may be placed on one base station, and all cells served by the base station may be scheduled by the real scheduler. Alternatively, multiple real schedulers separately corresponding to multiple cells may be placed on a base station that serves the multiple cells.

It should be noted that, the centralized virtual scheduler and the real scheduler in this embodiment of the present application may also be respectively referred to as a centralized virtual scheduling entity and a real scheduling entity, and may be functional entities or logical entities. That is, they may be in a software form and their functions are implemented by using a processor to execute program code; or they may be in a hardware form, for example, be placed on a baseband processing board as a chip or an application specific integrated circuit.

In this embodiment of the present application, a centralized virtual scheduler determines transmit power of each cell in multiple cells in a communications system, and sends the transmit power of each cell to a real scheduler of the cell, so as to instruct the real scheduler to schedule UE in the cell by using the transmit power determined by the centralized virtual scheduler. Therefore, by using a layered scheduling architecture according to the present application, an upper-layer centralized virtual scheduler coordinates resource utilization of the multiple cells and selects and delivers transmit power that ensures optimal network performance, so as to instruct a lower-layer real scheduler to schedule UE by using the optimal transmit power. This can reduce inter-cell interference and improve resource utilization efficiency.

The centralized virtual scheduler 1700 may implement steps that involve a centralized virtual scheduler in the methods in FIG. 15 and FIG. 16. To prevent repetition, no more details are given.

Optionally, as an embodiment, the determining unit 1701 may be specifically configured to determine transmit power at a finer granularity, that is, determine transmit power on each RB unit of the first cell, where the RB unit includes a PRB or an RBG. The interface unit 1702 may be configured to send the transmit power on each RB unit of the first cell to the real scheduler corresponding to the first cell, so as to instruct the real scheduler corresponding to the first cell to schedule UE on each RB unit of the first cell by using the transmit power determined by the determining unit 1701. In this way, RB-level power coordination may be implemented, so that a coordination granularity is finer, which further helps resolve a problem of inter-cell interference.

In view of a constraint of computation complexity, when a network reaches a certain scale, cells on the network need to be grouped into clusters according to a computation capability, an interference condition, and the like, so that inter-cluster interference may be minimized and intra-cluster interference may be relatively focused. In this case, multiple cells on a communications network are grouped into at least one cell cluster according to a condition of inter-cell interference, where multiple cells that have serious interference are grouped into a same cell cluster, and coordination is performed on resource utilization of the multiple cells in the same cell cluster, which implements power optimization on the cells in the cluster and prevents downlink inter-cell interference.

It should be understood that this embodiment of the present application does not limit a manner of grouping cells into clusters, where cells may be groups into clusters by number or location. For an example of grouping cells into clusters, reference may be made to the foregoing description, and the details are not described herein again.

One centralized virtual scheduler may be set for each cluster to perform transmit power coordination between cells.

Optionally, as another embodiment, the multiple cells are grouped into at least one cluster; the determining unit 1701 may be specifically configured to determine transmit power of each cell in each cluster on a cluster-by-cluster basis, that is, determine the transmit power of each cell on a cluster-by-cluster basis. Preferably, one cell cluster includes not more than 36 cells.

Optionally, as another embodiment, the centralized virtual scheduler 1700 may further include a first obtaining unit 1703, where the first obtaining unit 1703 is configured to obtain first channel information and first historical scheduling information, and the first channel information and the first historical scheduling information respectively include channel information and historical scheduling information of all cells in a cluster to which the first cell belongs. The determining unit 1701 may be specifically configured to calculate, according to the first channel information and the first historical scheduling information obtained by the first obtaining unit 1703, network utility values of the first cell under multiple power candidates, and select a power candidate with an optimal network utility value as the transmit power of the first cell; or the determining unit 1701 may be specifically configured to calculate, according to the first channel information and the first historical scheduling information obtained by the first obtaining unit 1703, network utility values of each RB unit of the first cell under multiple power candidates, and select a power candidate with an optimal network utility value as transmit power of the RB unit for which calculation is currently performed. The multiple power candidates may be multiple power classes that are incremental at a specific power step, or multiple power classes that are set in advance. This is not limited in this embodiment of the present application. For a specific embodiment, reference may be made to the foregoing description, and the details are not described herein again.

It should be understood that, the present application does not limit a virtual scheduling algorithm of the centralized virtual scheduler. A person skilled in the art may select different algorithms according to requirements as long as a power combination that ensures optimal network performance can be selected from multiple power combinations.

Optionally, as another embodiment, the centralized virtual scheduler 1700 may further include a second obtaining unit 1704, where the second obtaining unit 1704 is configured to obtain first load information, and the first load information includes load information of all the cells in the cluster to which the first cell belongs. The determining unit 1701 may be further configured to determine a load balancing result according to the first load information, where the load balancing result is that the first cell schedules edge UE of a second cell, and the first cell and the second cell are neighboring cells in the cluster to which the first cell belongs. The interface unit 1702 may be further configured to send the load balancing result to the real scheduler corresponding to the first cell, so as to instruct the real scheduler corresponding to the first cell to schedule the edge UE of the second cell.

Specifically, the determining unit 1701 may be specifically configured to coordinate load balancing according to load information of each cell. The determining unit 1701 may be further configured to determine a priority of each cell in the multiple cells according to the load information of each cell, and configure that the first cell in the multiple cells schedules the edge user equipment of the second cell, where the first cell and the second cell are neighboring cells and a priority of the second cell is higher than a priority of the first cell. A higher cell priority indicates heavier cell load. Optionally, CLB virtual scheduling may be periodically performed. Specifically, the sum of priorities of all cells in a cluster is determined as a target function within each period, where the greater differences between the priorities of the cells are, the larger the target function is; a cell (for example, the second cell is a heavily loaded cell, and the first cell is a lightly loaded cell, which causes a great difference between priorities of the two cells) that makes the target function be the largest may be first selected to configure scheduling of edge user equipment. In this way, the priority of the cell is affected by changing the cell that schedules the edge user equipment, which implements load balancing of cells, so as to improve coverage performance of a network.

Optionally, as another embodiment, when the communications system is in a distributed base station networking mode and a coordinator is deployed, base stations in the communications system are connected with the coordinator, the real scheduler of each cell may be located in a base station corresponding to the cell, and the centralized virtual scheduler may be located in the coordinator; or when baseband processing units (BBUs) of base stations in the communications system are placed together, the real scheduler of each cell may be located in a BBU corresponding to the cell, and the centralized virtual scheduler may be located in any BBU of the BBUs that are placed together. For a diagram of a scenario of the communications system, reference may be made to FIG. 6. It should be understood that this embodiment of the present application is not limited thereto and may be further applied to another communications system.

Optionally, in a case in which the coordinator performs CSPC virtual scheduling, in order to ensure that measurement information used by the coordinator to calculate the CSPC can arrive at the same time and that a power optimization result provided by the coordinator can become valid at air interfaces of all cells in a cluster at the same time, synchronization between the coordinator and the base station, that is, time alignment, needs to be implemented.

Specifically, the interface unit 1702 may be further configured to send a measurement request message to a real scheduler corresponding to a third cell in a downlink receive frame number and subframe number, and receive, in an uplink transmit frame number and subframe number, a measurement response message sent by the real scheduler corresponding to the third cell. An RTT of the real scheduler of the third cell is a largest RTT in the multiple cells in the communications system, and the RTT indicates a difference between the uplink transmit frame number and subframe number and the downlink receive frame number and subframe number. The determining unit 1701 may be further configured to determine a start time according to the RTT of the real scheduler corresponding to the third cell. The interface unit 1702 may be further configured to send the start time generated by the determining unit 1701 to the real scheduler corresponding to the first cell, so that the real scheduler corresponding to the first cell schedules the UE at the start time. For a specific time synchronization process, reference may be made to the foregoing description, and the details are not described herein again.

Optionally, in a case in which the coordinator performs CSPC virtual scheduling, the interface unit 1702 may be further configured to receive, from a control plane of each base station, information reported by cells served by the base station, where an SCTP protocol is used by an interface between a control plane of a main control board and the coordinator. Alternatively, the interface unit 1702 may be further configured to receive, from a user plane of each base station, information reported by cells served by the base station, where a GTP-U protocol is used by an interface between a user plane of a main control board and the coordinator. It should be understood that, this embodiment of the present application does not limit a transmission protocol used by the interface between the base station and the coordinator.

Optionally, one base station may be selected from distributed base stations, and the CLB virtual scheduling function is deployed on a dedicated baseband processing board (for example, a dedicated centralized scheduling board, or a baseband processing board in an enhanced scheduling mode) of the base station. That is, functional entities for CSPC virtual scheduling and CLB virtual scheduling may be distributed on different network devices.

Optionally, in a case in which a BBU performs CSPC virtual scheduling, the centralized virtual scheduler may be deployed on a common baseband processing board or a dedicated baseband processing board of any BBU (a first BBU), and the real scheduler of each cell may be located in a baseband processing board of a BBU corresponding to the cell. When the centralized virtual scheduler is located in the common baseband processing board of the first BBU, at least one core may be reserved in the baseband processing board of the first BBU to implement a function of the centralized virtual scheduler. Because complexity of the CSPC virtual scheduling linearly increases with the number of cells and the number of sub-bands, the CSPC virtual scheduling in a same cell cluster may be performed in parallel on a sub-band by sub-band basis. A load sharing manner of cores of the baseband processing board may specifically be that: in the case of full-band CSPC, one core in the at least one core determines downlink transmit power of each cell in a first cell cluster. In other words, load sharing is performed between the cores on a cell cluster-by-cell cluster basis, and the CSPC virtual scheduling of one cell cluster is processed by one core. Alternatively, in the case of sub-band CSPC, at least one core may jointly determine downlink transmit power of each cell in a first cell cluster. Optionally, sharing may be performed on a sub-band by sub-band basis, each core processes a different sub-band, and when remaining resources are available, at least one core may further jointly process another cell cluster. Because CLB is full-band processing and complexity of CSPC centralized virtual scheduling linearly increases only with the number of cells, load sharing may be performed between cores on a cell cluster-by-cell cluster basis, and the CSPC centralized virtual scheduling of one cell cluster is processed by one core.

Optionally, the centralized virtual scheduler deployed on the first BBU may further implement the CLB virtual scheduling function. That is, functional entities for the CSPC virtual scheduling and the CLB virtual scheduling may be integrated on one physical entity.

Figure 18:
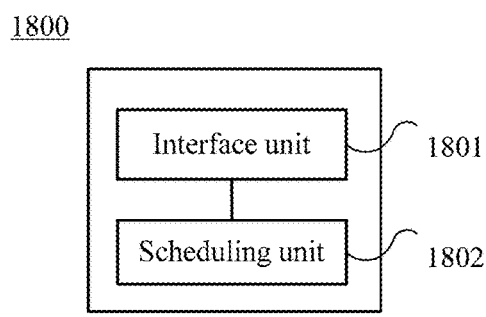
FIG. 18 is a schematic block diagram of a real scheduler according to an embodiment of the present application.

FIG. 18 is a schematic structural diagram of a real scheduler according to an embodiment of the present application. The real scheduler 1800 in FIG. 18 is an example of the real schedulers in the foregoing scheduling systems, and includes an interface unit 1801 and a scheduling unit 1802.

The interface unit 1801 is configured to receive transmit power that is of a first cell and determined by a centralized virtual scheduler where the first cell is each cell in multiple cells in a communications system.

The scheduling unit 1802 is configured to schedule UE in the first cell by using the transmit power determined by the centralized virtual scheduler.

It should be understood that, in this embodiment of the present application, the number of real schedulers is not limited and may be one or more than one. Moreover, each real scheduler may schedule one or more cells. For example, one real scheduler may be placed on one base station, and all cells served by the base station may be scheduled by the real scheduler. Alternatively, multiple real schedulers separately corresponding to multiple cells may be placed on a base station that serves the multiple cells.

It should be noted that, the centralized virtual scheduler and the real scheduler in this embodiment of the present application may also be respectively referred to as a centralized virtual scheduling entity and a real scheduling entity, and may be functional entities or logical entities. That is, they may be in a software form and their functions are implemented by using a processor to execute program code;

or they may be in a hardware form, for example, be placed on a baseband processing board as a chip or an application specific integrated circuit.

In this embodiment of the present application, a real scheduler of a cell receives transmit power that is of the cell and sent by a centralized virtual scheduler, and schedules UE in the cell by using the transmit power determined by the centralized virtual scheduler; for a real scheduler of a cell in multiple cells, the centralized virtual scheduler is configured to determine transmit power of each cell in the multiple cells in a communications system, where the multiple cells include the cell. Therefore, by using a layered scheduling architecture according to the present application, an upper-layer centralized virtual scheduler coordinates resource utilization of the multiple cells and selects and delivers transmit power that ensures optimal network performance, and a lower-layer real scheduler schedules UE by using the optimal transmit power. This can reduce inter-cell interference and improve resource utilization efficiency.

The real scheduler 1800 may implement steps that involve a real scheduler in the methods in FIG. 15 and FIG. 16. To prevent repetition, no more details are given.

Optionally, as another embodiment, the interface unit 1801 may be configured to receive transmit power that is on each RB unit of the first cell and sent by the centralized virtual scheduler, where the RB unit includes a PRB or an RBG. The scheduling unit 1802 may be specifically configured to schedule UE on each RB unit of the first cell by using the transmit power determined by the centralized virtual scheduler. In this way, RB-level power coordination may be implemented, so that a coordination granularity is finer, which further helps resolve a problem of inter-cell interference.

Optionally, as another embodiment, the interface unit 1801 may be further configured to receive a load balancing result determined by the centralized virtual scheduler, where the load balancing result is that the first cell schedules edge UE of a second cell, where the first cell and the second cell are neighboring cells in the multiple cells and are located in a same cluster. The scheduling unit 1802 may be further configured to schedule the edge UE of the second cell according to the load balancing result. Therefore, a priority of a cell is affected by changing a cell that schedules edge user equipment, which implements load balancing of cells, so as to improve coverage performance of a network.

Optionally, as another embodiment, when the communications system is in a distributed base station networking mode and a coordinator is deployed, base stations in the communications system are connected with the coordinator, the real scheduler of each cell may be located in a base station corresponding to the cell, and the centralized virtual scheduler may be located in the coordinator; or when baseband processing units (BBUs) of base stations in the communications system are placed together, the real scheduler of each cell may be located in a BBU corresponding to the cell, and the centralized virtual scheduler may be located in any BBU of the BBUs that are placed together. For a diagram of a scenario of the communications system, reference may be made to FIG. 6. It should be understood that this embodiment of the present application is not limited thereto and may be further applied to another communications system.

Optionally, in a case in which the coordinator performs CSPC virtual scheduling, in order to ensure that measurement information used by the coordinator to calculate the CSPC can arrive at the same time and that a power optimization result provided by the coordinator can become valid at air interfaces of all cells in a cluster at the same time, synchronization between the coordinator and the base station, that is, time alignment, needs to be implemented.

Specifically, the interface unit 1801 may be further configured to receive, in a downlink receive frame number and subframe number, a measurement request message sent by the centralized virtual scheduler, and send, in an uplink transmit frame number and subframe number, a measurement response message to the centralized virtual scheduler, so that the centralized virtual scheduler obtains an RTT of the real scheduler according to the uplink transmit frame number and subframe number and the downlink receive frame number and subframe number, selects a largest RTT from all RTTs of the multiple cells in the communications system, and determines a start time according to the largest RTT. The RTT indicates a difference between the uplink transmit frame number and subframe number and the downlink receive frame number and subframe number. The interface unit 1801 may be further configured to receive the start time sent by the centralized virtual scheduler, and instruct the scheduling unit 1802 to schedule the user equipment at the start time. For a specific time synchronization process, reference may be made to the foregoing description, and the details are not described herein again.

Optionally, in a case in which a BBU performs CSPC virtual scheduling, the centralized virtual scheduler may be deployed on a common baseband processing board or a dedicated baseband processing board of any BBU (a first BBU), and the real scheduler of each cell may be located in a baseband processing board of a BBU corresponding to the cell. When the centralized virtual scheduler is located in the common baseband processing board of the first BBU, at least one core may be reserved in the baseband processing board of the first BBU to implement a function of the centralized virtual scheduler. Because complexity of the CSPC virtual scheduling linearly increases with the number of cells and the number of sub-bands, the CSPC virtual scheduling in a same cell cluster may be performed in parallel on a sub-band by sub-band basis. A load sharing manner of cores of the baseband processing board may specifically be that: in the case of full-band CSPC, one core in at least one core determines downlink transmit power of each cell in a first cell cluster. In other words, load sharing is performed between the cores on a cell cluster-by-cell cluster basis, and the CSPC virtual scheduling of one cell cluster is processed by one core. Alternatively, in the case of sub-band CSPC, at least one core may jointly determine downlink transmit power of each cell in a first cell cluster. Optionally, sharing may be performed on a sub-band by sub-band basis, each core processes a different sub-band, and when remaining resources are available, at least one core may further jointly process another cell cluster. Because CLB is full-band processing and complexity of CSPC centralized virtual scheduling linearly increases only with the number of cells, load sharing may be performed between cores on a cell cluster-by-cell cluster basis, and the CSPC centralized virtual scheduling of one cell cluster is processed by one core.

Optionally, the scheduling unit 1802 may be specifically configured to perform sub-band or full-band MCS correction on user equipment according to downlink transmit power that is of a cell and sent by the centralized virtual scheduler. In this way, the MCS for initial transmission or retransmission scheduling is determined, and real scheduling may be periodically performed.

It should be noted that, the interface unit in this embodiment may be an interface circuit. The determining unit may be a processor that is independently set, may be implemented by means of integration into a processor of a base station, or may be stored in a memory of a base station in a form of program code, which is invoked by a processor of the base station to execute functions of the foregoing determining unit. Implementation of the first obtaining unit, the second obtaining unit, and the scheduling unit is the same as that of the determining unit. The processor may be a central processing unit (CPU) or an application specific integrated circuit (ASIC), or one or more integrated circuits configured to implement an embodiment of the present application.

Figure 19:
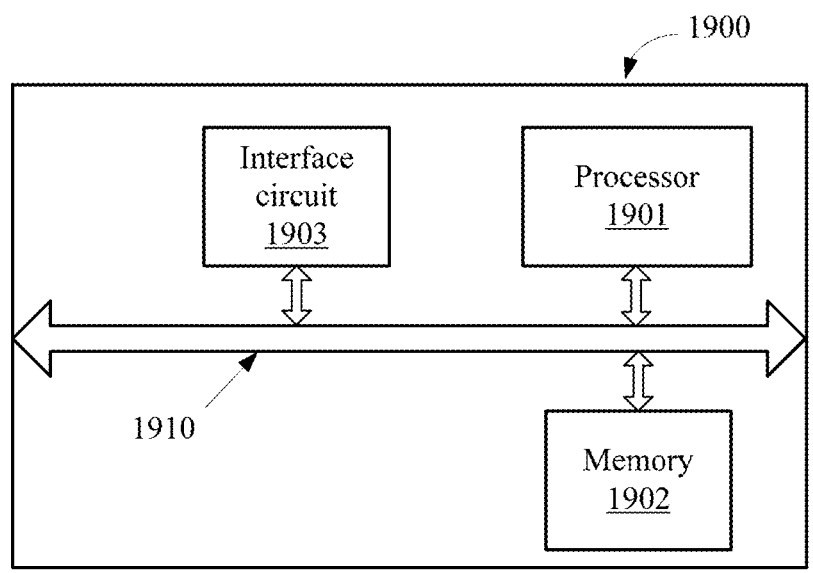
FIG. 19 is a schematic block diagram of a centralized virtual scheduler according to another embodiment of the present application.

FIG. 19 is a schematic structural diagram of a centralized virtual scheduler according to another embodiment of the present application. The centralized virtual scheduler 1900 in FIG. 19 is an example of the centralized virtual schedulers in the foregoing scheduling systems. The centralized virtual scheduler 1900 includes a processor 1901, a memory 1902, and an interface circuit 1903. The processor 1901 controls operations of the device 1900, and the processor 1901 may be a CPU, an ASIC, or one or more integrated circuits configured to implement an embodiment of the present application. The memory 1902 may include a read-only memory and a random access memory and provide instructions and data for the processor 1901. A part of the memory 1902 may further include a nonvolatile random access memory (NVRAM). The processor 1901, the memory 1902, and the interface circuit 1903 are coupled together by using a bus system 1910. In addition to a data bus, the bus system 1910 further includes a power bus, a control bus, and a status signal bus. However, for the sake of clarity, the various buses are collectively illustrated as the bus system 1910 in the figure.

The functions that involve the centralized virtual schedulers in the scheduling systems according to the foregoing embodiments of the present application may be implemented by using the centralized virtual scheduler 1900. The processor 1901 may be an integrated circuit chip that has a signal processing capability. During an implementation process, steps of the foregoing methods may be completed by an integrated logic circuit of hardware or instructions in a software form in the processor 1901. The processor 1901 may be a general processor, which includes a CPU, an NP, or the like; or the processor 1901 may be a DSP, an ASIC, an FPGA, or another programmable logical device, discrete gate or transistor logic device, or discrete hardware component. The processor 1901 may implement or execute the methods, steps, or logical block diagrams disclosed in the embodiments of the present application. The general processor may be a microprocessor, or the processor may be any conventional processor.

In this embodiment, the processor 1901 is configured to determine transmit power of a first cell, where the first cell is each cell in multiple cells in a communications system. The interface circuit 1903 is configured to send the transmit power determined by the centralized virtual scheduler to a real scheduler corresponding to the first cell, so as to instruct the real scheduler corresponding to the first cell to schedule UE in the first cell by using the transmit power determined by the centralized virtual scheduler.

It should be understood that, in this embodiment of the present application, the number of real schedulers is not limited and may be one or more than one. Moreover, each real scheduler may schedule one or more cells. For example, one real scheduler may be placed on one base station, and all cells served by the base station may be scheduled by the real scheduler. Alternatively, multiple real schedulers separately corresponding to multiple cells may be placed on a base station that serves the multiple cells.

It should be noted that, the centralized virtual scheduler and the real scheduler in this embodiment of the present application may also be respectively referred to as a centralized virtual scheduling entity and a real scheduling entity, and may be functional entities or logical entities. That is, they may be in a software form and their functions are implemented by using a processor to execute program code; or they may be in a hardware form, for example, be placed on a baseband processing board as a chip or an application specific integrated circuit.

In this embodiment of the present application, a centralized virtual scheduler determines transmit power of each cell in multiple cells in a communications system, and sends the transmit power of each cell to a real scheduler of the cell, so as to instruct the real scheduler to schedule UE in the cell by using the transmit power determined by the centralized virtual scheduler. Therefore, by using a layered scheduling architecture according to the present application, an upper-layer centralized virtual scheduler coordinates resource utilization of the multiple cells and selects and delivers transmit power that ensures optimal network performance, so as to instruct a lower-layer real scheduler to schedule UE by using the optimal transmit power. This can reduce inter-cell interference and improve resource utilization efficiency.

The centralized virtual scheduler 1900 may implement steps that involve a centralized virtual scheduler in the methods in FIG. 15 and FIG. 16. To prevent repetition, no more details are given.

Optionally, as an embodiment, the processor 1901 may be specifically configured to determine transmit power at a finer granularity, that is, determine transmit power on each RB unit of the first cell, where the RB unit includes a PRB or an RBG. The interface circuit 1903 may be configured to send the transmit power on each RB unit of the first cell to the real scheduler corresponding to the first cell, so as to instruct the real scheduler corresponding to the first cell to schedule UE on each RB unit of the first cell by using the transmit power determined by the processor 1901. In this way, RB-level power coordination may be implemented, so that a coordination granularity is finer, which further helps resolve a problem of inter-cell interference.

In view of a constraint of computation complexity, when a network reaches a certain scale, cells on the network need to be grouped into clusters according to a computation capability, an interference condition, and the like, so that inter-cluster interference may be minimized and intra-cluster interference may be relatively focused. In this case, multiple cells on a communications network are grouped into at least one cell cluster according to a condition of inter-cell interference, where multiple cells that have serious interference are grouped into a same cell cluster, and coordination is performed on resource utilization of the multiple cells in the same cell cluster, which implements power optimization on the cells in the cluster and prevents downlink inter-cell interference.

It should be understood that this embodiment of the present application does not limit a manner of grouping cells into clusters, where cells may be groups into clusters by number or location. For an example of grouping cells into clusters, reference may be made to the foregoing description, and the details are not described herein again.

One centralized virtual scheduler may be set for each cluster to perform transmit power coordination between cells.

Optionally, as another embodiment, the multiple cells are grouped into at least one cluster; the processor 1901 may be specifically configured to determine transmit power of each cell in each cluster on a cluster-by-cluster basis, that is, determine the transmit power of each cell on a cluster-by-cluster basis. Preferably, one cell cluster includes not more than 36 cells.

Optionally, as another embodiment, the processor 1901 may be further configured to obtain first channel information and first historical scheduling information, where the first channel information and the first historical scheduling information respectively include channel information and historical scheduling information of all cells in a cluster to which the first cell belongs. The processor 1901 may be specifically configured to calculate network utility values of the first cell under multiple power candidates according to the obtained first channel information and first historical scheduling information, and select a power candidate with an optimal network utility value as the transmit power of the first cell. Alternatively, the processor 1901 may be specifically configured to calculate network utility values of each RB unit of the first cell under multiple power candidates according to the obtained first channel information and first historical scheduling information, and select a power candidate with an optimal network utility value as transmit power of the RB unit for which calculation is currently performed. The multiple power candidates may be multiple power classes that are incremental at a specific power step, or multiple power classes that are set in advance. This is not limited in this embodiment of the present application. For a specific embodiment, reference may be made to the foregoing description, and the details are not described herein again.

It should be understood that, the present application does not limit a virtual scheduling algorithm of the centralized virtual scheduler. A person skilled in the art may select different algorithms according to requirements as long as a power combination that ensures optimal network performance can be selected from multiple power combinations.

Optionally, as another embodiment, the processor 1901 may be further configured to: obtain first load information, where the first load information includes load information of all the cells in the cluster to which the first cell belongs; and determine a load balancing result according to the first load information, where the load balancing result is that the first cell schedules edge UE of a second cell, and the first cell and the second cell are neighboring cells in the cluster to which the first cell belongs. The interface circuit 1903 may be further configured to send the load balancing result to the real scheduler corresponding to the first cell, so as to instruct the real scheduler corresponding to the first cell to schedule the edge UE of the second cell. Further, the processor 1901 may be further specifically configured to determine the load balancing result on a cluster-by-cluster basis.

Specifically, the processor 1901 may be specifically configured to coordinate load balancing according to load information of each cell. The processor 1901 may be further configured to determine a priority of each cell in the multiple cells according to the load information of each cell, and configure that the first cell in the multiple cells schedules the edge user equipment of the second cell, where the first cell and the second cell are neighboring cells and a priority of the second cell is higher than a priority of the first cell. A higher cell priority indicates heavier cell load. Optionally, CLB virtual scheduling may be periodically performed. Specifically, the sum of priorities of all cells in a cluster is determined as a target function within each period, where the greater differences between the priorities of the cells are, the larger the target function is; a cell (for example, the second cell is a heavily loaded cell, and the first cell is a lightly loaded cell, which causes a great difference between priorities of the two cells) that makes the target function be the largest may be first selected to configure scheduling of edge user equipment. In this way, the priority of the cell is affected by changing the cell that schedules the edge user equipment, which implements load balancing of cells, so as to improve coverage performance of a network.

Optionally, as another embodiment, when the communications system is in a distributed base station networking mode and a coordinator is deployed, base stations in the communications system are connected with the coordinator, the real scheduler of each cell may be located in a base station corresponding to the cell, and the centralized virtual scheduler may be located in the coordinator; or when baseband processing units (BBUs) of base stations in the communications system are placed together, the real scheduler of each cell may be located in a BBU corresponding to the cell, and the centralized virtual scheduler may be located in any BBU of the BBUs that are placed together. For a diagram of a scenario of the communications system, reference may be made to FIG. 6. It should be understood that this embodiment of the present application is not limited thereto and may be further applied to another communications system.

Optionally, in a case in which the coordinator performs CSPC virtual scheduling, in order to ensure that measurement information used by the coordinator to calculate the CSPC can arrive at the same time and that a power optimization result provided by the coordinator can become valid at air interfaces of all cells in a cluster at the same time, synchronization between the coordinator and the base station, that is, time alignment, needs to be implemented.

Specifically, the interface circuit 1903 may be further configured to send a measurement request message to a real scheduler corresponding to a third cell in a downlink receive frame number and subframe number, and receive, in an uplink transmit frame number and subframe number, a measurement response message sent by the real scheduler corresponding to the third cell. An RTT of the real scheduler of the third cell is a largest RTT in the multiple cells in the communications system, and the RTT indicates a difference between the uplink transmit frame number and subframe number and the downlink receive frame number and subframe number. The processor 1901 may be further configured to determine a start time according to the RTT of the real scheduler corresponding to the third cell. The interface circuit 1903 may be further configured to send the start time generated by the processor 1901 to the real scheduler corresponding to the first cell, so that the real scheduler corresponding to the first cell schedules the UE at the start time. For a specific time synchronization process, reference may be made to the foregoing description, and the details are not described herein again.

Optionally, in a case in which the coordinator performs CSPC virtual scheduling, the interface circuit 1903 may be further configured to receive, from a control plane of each base station, information reported by cells served by the base station, where an SCTP protocol is used by an interface between a control plane of a main control board and the coordinator. Alternatively, the interface circuit 1903 may be further configured to receive, from a user plane of each base station, information reported by cells served by the base station, where a GTP-U protocol is used by an interface between a user plane of a main control board and the coordinator. It should be understood that, this embodiment of the present application does not limit a transmission protocol used by the interface between the base station and the coordinator.

Optionally, one base station may be selected from distributed base stations, and the CLB virtual scheduling function is deployed on a dedicated baseband processing board (for example, a dedicated centralized scheduling board, or a baseband processing board in an enhanced scheduling mode) of the base station. That is, functional entities for CSPC virtual scheduling and CLB virtual scheduling may be distributed on different network devices.

Optionally, in a case in which a BBU performs CSPC virtual scheduling, the centralized virtual scheduler may be deployed on a common baseband processing board or a dedicated baseband processing board of any BBU (a first BBU), and the real scheduler of each cell may be located in a baseband processing board of a BBU corresponding to the cell. When the centralized virtual scheduler is located in the common baseband processing board of the first BBU, at least one core may be reserved in the baseband processing board of the first BBU to implement a function of the centralized virtual scheduler. Because complexity of the CSPC virtual scheduling linearly increases with the number of cells and the number of sub-bands, the CSPC virtual scheduling in a same cell cluster may be performed in parallel on a sub-band by sub-band basis. A load sharing manner of cores of the baseband processing board may specifically be that: in the case of full-band CSPC, one core in the at least one core determines downlink transmit power of each cell in a first cell cluster. In other words, load sharing is performed between the cores on a cell cluster-by-cell cluster basis, and the CSPC virtual scheduling of one cell cluster is processed by one core. Alternatively, in the case of sub-band CSPC, at least one core may jointly determine downlink transmit power of each cell in a first cell cluster. Optionally, sharing may be performed on a sub-band by sub-band basis, each core processes a different sub-band, and when remaining resources are available, at least one core may further jointly process another cell cluster. Because CLB is full-band processing and complexity of CSPC centralized virtual scheduling linearly increases only with the number of cells, load sharing may be performed between cores on a cell cluster-by-cell cluster basis, and the CSPC centralized virtual scheduling of one cell cluster is processed by one core.

Optionally, the centralized virtual scheduler deployed on the first BBU may further implement the CLB virtual scheduling function. That is, functional entities for the CSPC virtual scheduling and the CLB virtual scheduling may be integrated on one physical entity.

Figure 20:
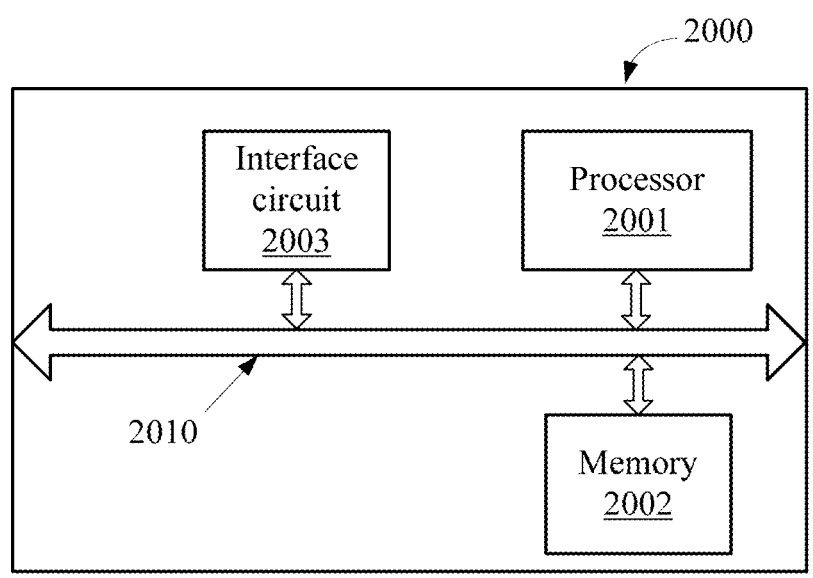
FIG. 20 is a schematic block diagram of a real scheduler according to another embodiment of the present application.

FIG. 20 is a schematic structural diagram of a real scheduler according to another embodiment of the present application. The real scheduler 2000 in FIG. 20 is an example of the real schedulers in the foregoing scheduling systems. The real scheduler 2000 includes a processor 2001, a memory 2002, and an interface circuit 2003. The processor 2001 controls operations of the device 2000, and the processor 2001 may be a CPU, an ASIC, or one or more integrated circuits configured to implement an embodiment of the present application. The memory 2002 may include a read-only memory and a random access memory and provide instructions and data for the processor 2001. A part of the memory 2002 may further include a nonvolatile random access memory (NVRAM). The processor 2001, the memory 2002, and the interface circuit 2003 are coupled together by using a bus system 2010. In addition to a data bus, the bus system 2010 further includes a power bus, a control bus, and a status signal bus. However, for the sake of clarity, the various buses are collectively illustrated as the bus system 2010 in the figure.

The real schedulers in the scheduling systems according to the foregoing embodiments of the present application may be implemented by using the real scheduler 2000. The processor 2001 may be an integrated circuit chip that has a signal processing capability. During an implementation process, steps of the foregoing methods may be completed by an integrated logic circuit of hardware or instructions in a software form in the processor 2001. The processor 2001 may be a general processor, which includes a CPU, an NP, or the like; or the processor 2001 may be a DSP, an ASIC, an FPGA, or another programmable logical device, discrete gate or transistor logic device, or discrete hardware component. The processor 2001 may implement or execute the methods, steps, or logical block diagrams disclosed in the embodiments of the present application. The general processor may be a microprocessor, or the processor may be any conventional processor.

In this embodiment, the interface unit 2003 is configured to receive transmit power that is of a first cell and determined by a centralized virtual scheduler, where the first cell is each cell in multiple cells in a communications system. The processor 2001 is configured to schedule UE in the first cell by using the transmit power determined by the centralized virtual scheduler.

It should be understood that, in this embodiment of the present application, the number of real schedulers is not limited and may be one or more than one. Moreover, each real scheduler may schedule one or more cells. For example, one real scheduler may be placed on one base station, and all cells served by the base station may be scheduled by the real scheduler. Alternatively, multiple real schedulers separately corresponding to multiple cells may be placed on a base station that serves the multiple cells.

It should be noted that, the centralized virtual scheduler and the real scheduler in this embodiment of the present application may also be respectively referred to as a centralized virtual scheduling entity and a real scheduling entity, and may be functional entities or logical entities. That is, they may be in a software form and their functions are implemented by using a processor to execute program code; or they may be in a hardware form, for example, be placed on a baseband processing board as a chip or an application specific integrated circuit.

In this embodiment of the present application, a real scheduler of a cell receives transmit power that is of the cell and sent by a centralized virtual scheduler, and schedules UE in the cell by using the transmit power determined by the centralized virtual scheduler; for a real scheduler of a cell in multiple cells, the centralized virtual scheduler is configured to determine transmit power of each cell in the multiple cells in a communications system, where the multiple cells include the cell. Therefore, by using a layered scheduling architecture according to the present application, an upper-layer centralized virtual scheduler coordinates resource utilization of the multiple cells and selects and delivers transmit power that ensures optimal network performance, and a lower-layer real scheduler schedules UE by using the optimal transmit power. This can reduce inter-cell interference and improve resource utilization efficiency.

The real scheduler 2000 may implement steps that involve a real scheduler in the methods in FIG. 15 and FIG. 16. To prevent repetition, no more details are given.

Optionally, as another embodiment, the interface circuit 2003 may be configured to receive transmit power that is on each RB unit of the first cell and sent by the centralized virtual scheduler, where the RB unit includes a PRB or an RBG. The processor 2001 may be specifically configured to schedule UE on each RB unit of the first cell by using the transmit power determined by the centralized virtual scheduler. In this way, RB-level power coordination may be implemented, so that a coordination granularity is finer, which further helps resolve a problem of inter-cell interference.

Optionally, as another embodiment, the interface circuit 2003 may be further configured to receive a load balancing result sent by the centralized virtual scheduler, where the load balancing result is determined by the centralized virtual scheduler. The processor 2001 may be further configured to schedule edge user equipment of a second cell according to the load balancing result, where the first cell and the second cell are neighboring cells. Therefore, a priority of a cell is affected by changing a cell that schedules edge user equipment, which implements load balancing of cells, so as to improve coverage performance of a network.

Optionally, as another embodiment, when the communications system is in a distributed base station networking mode and a coordinator is deployed, base stations in the communications system are connected with the coordinator, the real scheduler of each cell may be located in a base station corresponding to the cell, and the centralized virtual scheduler may be located in the coordinator; or when baseband processing units (BBUs) of base stations in the communications system are placed together, the real scheduler of each cell may be located in a BBU corresponding to the cell, and the centralized virtual scheduler may be located in any BBU of the BBUs that are placed together. For a diagram of a scenario of the communications system, reference may be made to FIG. 6. It should be understood that this embodiment of the present application is not limited thereto and may be further applied to another communications system.

Optionally, in a case in which the coordinator performs CSPC virtual scheduling, in order to ensure that measurement information used by the coordinator to calculate the CSPC can arrive at the same time and that a power optimization result provided by the coordinator can become valid at air interfaces of all cells in a cluster at the same time, synchronization between the coordinator and the base station, that is, time alignment, needs to be implemented.

Specifically, the interface circuit 2003 may be further configured to receive, in a downlink receive frame number and subframe number, a measurement request message sent by the centralized virtual scheduler, and send, in an uplink transmit frame number and subframe number, a measurement response message to the centralized virtual scheduler, so that the centralized virtual scheduler obtains an RTT of the real scheduler according to the uplink transmit frame number and subframe number and the downlink receive frame number and subframe number, selects a largest RTT from all RTTs of the multiple cells in the communications system, and determines a start time according to the largest RTT. The RTT indicates a difference between the uplink transmit frame number and subframe number and the downlink receive frame number and subframe number. The interface circuit 2003 may be further configured to receive the start time sent by the centralized virtual scheduler, and instruct the processor 2001 to schedule the user equipment at the start time. For a specific time synchronization process, reference may be made to the foregoing description, and the details are not described herein again.

Optionally, in a case in which a BBU performs CSPC virtual scheduling, the centralized virtual scheduler may be deployed on a common baseband processing board or a dedicated baseband processing board of any BBU (a first BBU), and the real scheduler of each cell may be located in a baseband processing board of a BBU corresponding to the cell. When the centralized virtual scheduler is located in the common baseband processing board of the first BBU, at least one core may be reserved in the baseband processing board of the first BBU to implement a function of the centralized virtual scheduler. Because complexity of the CSPC virtual scheduling linearly increases with the number of cells and the number of sub-bands, the CSPC virtual scheduling in a same cell cluster may be performed in parallel on a sub-band by sub-band basis. A load sharing manner of cores of the baseband processing board may specifically be that: in the case of full-band CSPC, one core in at least one core determines downlink transmit power of each cell in a first cell cluster. In other words, load sharing is performed between the cores on a cell cluster-by-cell cluster basis, and the CSPC virtual scheduling of one cell cluster is processed by one core. Alternatively, in the case of sub-band CSPC, at least one core may jointly determine downlink transmit power of each cell in a first cell cluster. Optionally, sharing may be performed on a sub-band by sub-band basis, each core processes a different sub-band, and when remaining resources are available, at least one core may further jointly process another cell cluster. Because CLB is full-band processing and complexity of CSPC centralized virtual scheduling linearly increases only with the number of cells, load sharing may be performed between cores on a cell cluster-by-cell cluster basis, and the CSPC centralized virtual scheduling of one cell cluster is processed by one core.

Optionally, the processor 2001 may be specifically configured to perform sub-band or full-band MCS correction on user equipment according to downlink transmit power that is of a cell and sent by the centralized virtual scheduler. In this way, the MCS for initial transmission or retransmission scheduling is determined, and real scheduling may be periodically performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A centralized virtual scheduler for a communications system that comprises multiple cells, each cell in the multiple cells corresponding to one real scheduler, wherein the centralized virtual scheduler comprises:
   a non-transitory computer-readable storage medium having processor-executable instructions stored thereon; and
   a processor, configured to execute the processor-executable instructions to facilitate:
      determining transmit power of a first cell of the multiple cells in the communications system; and
      sending the transmit power of the first cell to a real scheduler corresponding to the first cell, so as to instruct the real scheduler corresponding to the first cell to schedule user equipment in the first cell based on the transmit power;
   wherein the multiple cells are grouped into at least one cluster, and transmit power of each cell in each cluster is determined on a cluster-by-cluster basis;
   wherein determining the transmit power of the first cell further comprises:
      obtaining first channel information and first historical scheduling information, wherein the first channel information and the first historical scheduling information respectively comprise channel information and historical scheduling information of all cells in a cluster to which the first cell belongs;
      calculating, according to the first channel information and the first historical scheduling information, network utility values of the first cell under multiple power candidates; and
      selecting a power candidate with an optimal network utility value as the transmit power of the first cell.

2. The centralized virtual scheduler according to claim 1, wherein the processor is further configured to execute the processor-executable instructions to facilitate:
   determining transmit power on each resource block (RB) unit of the first cell, wherein each RB unit comprises a physical resource block (PRB) or a resource block group (RBG); and
   sending the transmit power on each RB unit of the first cell to the real scheduler corresponding to the first cell, so as to instruct the real scheduler corresponding to the first cell to schedule the user equipment on each RB unit of the first cell based on the transmit power.

3. The centralized virtual scheduler according to claim 1, wherein the processor is further configured to execute the processor-executable instructions to facilitate:
   obtaining first load information, wherein the first load information comprises load information of all cells in the cluster to which the first cell belongs;
   determining a load balancing result according to the first load information, wherein the load balancing result is that the first cell schedules edge user equipment of a second cell, wherein the first cell and the second cell are neighboring cells in the cluster to which the first cell belongs; and
   sending the load balancing result to the real scheduler corresponding to the first cell, so as to instruct the real scheduler corresponding to the first cell to schedule the edge user equipment of the second cell.

4. The centralized virtual scheduler according to claim 1, wherein the communications system is in a distributed base station networking mode and a coordinator is deployed in the communications system, wherein base stations in the communications system are connected with the coordinator, wherein the real scheduler corresponding to each cell is located in a base station corresponding to the cell, and wherein the centralized virtual scheduler is located in the coordinator.

5. The centralized virtual scheduler according to claim 1, wherein baseband processing units (BBUs) of the communications system are placed together, wherein the real scheduler corresponding to each cell in the multiple cells is located in a BBU corresponding to the cell, and wherein the centralized virtual scheduler is located in a BBU of the BBUs that are placed together.

6. A centralized virtual scheduler for a communications system that comprises multiple cells, each cell in the multiple cells corresponding to one real scheduler, wherein the centralized virtual scheduler comprises:
   a non-transitory computer-readable storage medium having processor-executable instructions stored thereon; and
   a processor, configured to execute the processor-executable instructions to facilitate:
      determining transmit power of a first cell of the multiple cells in the communications system; and sending the transmit power of the first cell to a real scheduler corresponding to the first cell, so as to instruct the real scheduler corresponding to the first cell to schedule user equipment in the first cell based on the transmit power;

wherein the multiple cells are grouped into at least one cluster, and transmit power of each cell in each cluster is determined on a cluster-by-cluster basis;

wherein determining the transmit power of the first cell further comprises:

obtaining first channel information and first historical scheduling information, wherein the first channel information and the first historical scheduling information respectively comprise channel information and historical scheduling information of all cells in a cluster to which the first cell belongs;

calculating, according to the first channel information and the first historical scheduling information, network utility values of each resource block (RB) unit of the first cell under multiple power candidates; and selecting a power candidate with an optimal network utility value as transmit power for each RB unit.

7. A centralized virtual scheduler for a communications system that comprises multiple cells, each cell in the multiple cells corresponding to one real scheduler, wherein the centralized virtual scheduler comprises:

a non-transitory computer-readable storage medium having processor-executable instructions stored thereon; and a processor, configured to execute the processor-executable instructions to facilitate:

determining transmit power of a first cell of the multiple cells in the communications system; and sending the transmit power of the first cell to a real scheduler corresponding to the first cell, so as to instruct the real scheduler corresponding to the first cell to schedule user equipment in the first cell based on the transmit power;

wherein the multiple cells are grouped into at least one cluster, and transmit power of each cell in each cluster is determined on a cluster-by-cluster basis;

wherein the processor is further configured to execute the processor-executable instructions to facilitate:

obtaining first load information, wherein the first load information comprises load information of all cells in the cluster to which the first cell belongs;

determining a load balancing result according to the first load information, wherein the load balancing result is that the first cell schedules edge user equipment of a second cell, wherein the first cell and the second cell are neighboring cells in the cluster to which the first cell belongs; and sending the load balancing result to the real scheduler corresponding to the first cell, so as to instruct the real scheduler corresponding to the first cell to schedule the edge user equipment of the second cell;

wherein the processor is further configured to execute the processor-executable instructions to facilitate:

sending a measurement request message to a real scheduler corresponding to a third cell in a downlink receive frame number and subframe number;

receiving, in an uplink transmit frame number and subframe number, a measurement response message from the real scheduler corresponding to the third cell, wherein a round trip time (RTT) of the real scheduler corresponding to the third cell is a largest RTT in the multiple cells in the communications system, wherein the RTT indicates a difference between the uplink transmit frame number and subframe number and the downlink receive frame number and subframe number;

determining a start time according to the RTT of the real scheduler corresponding to the third cell; and sending the start time to the real scheduler corresponding to the first cell to facilitate the real scheduler corresponding to the first cell scheduling the user equipment at the start time.

8. A real scheduler for a communications system that comprises multiple cells, each cell in the multiple cells corresponding to one real scheduler, wherein the real scheduler comprises:

a non-transitory computer-readable storage medium having processor-executable instructions stored thereon; and a processor, configured to execute the processor-executable instructions to facilitate:

receiving transmit power of a first cell, which is determined by a centralized virtual scheduler, wherein the first cell is a cell of the multiple cells in the communications system; and scheduling user equipment in the first cell based on the transmit power determined by the centralized virtual scheduler;

wherein the communications system is in a distributed base station networking mode and a coordinator is deployed in the communications system, wherein base stations in the communications system are connected with the coordinator, wherein the real scheduler corresponding to each cell in the multiple cells is located in a base station corresponding to the cell, and wherein the centralized virtual scheduler is located in the coordinator;

wherein the processor is further configured to execute the processor-executable instructions to facilitate:

receiving, in a downlink receive frame number and subframe number, a measurement request message from the centralized virtual scheduler;

sending, in an uplink transmit frame number and subframe number, a measurement response message to the centralized virtual scheduler to enable the centralized virtual scheduler to obtain a round trip time (RTT) of the real scheduler according to the uplink transmit frame number and subframe number and the downlink receive frame number and subframe number, select a largest RTT from all RTTs of the multiple cells in the communications system, and determine a start time according to the largest RTT, wherein the RTT indicates a difference between the uplink transmit frame number and subframe number and the downlink receive frame number and subframe number;

receiving the start time from the centralized virtual scheduler; and scheduling the user equipment at the start time.

9. The real scheduler according to claim 8, wherein the processor is further configured to execute the processor-executable instructions to facilitate:

receiving transmit power that is on each resource block (RB) unit of the first cell, which is determined by the centralized virtual scheduler, wherein each RB unit comprises a physical resource block (PRB) or a resource block group (RBG); and scheduling the user equipment on each RB unit of the first cell based on the transmit power determined by the centralized virtual scheduler.

10. The real scheduler according to claim 8, wherein the processor is further configured to execute the processor-executable instructions to facilitate:

receiving a load balancing result determined by the centralized virtual scheduler, wherein the load balancing result is that the first cell schedules edge user equipment of a second cell, wherein the first cell and the second cell are neighboring cells in the multiple cells and are located in a same cluster; and scheduling the edge user equipment of the second cell according to the load balancing result.

11. The real scheduler according to claim 8, wherein baseband processing units (BBUs) of the communications system are placed together, wherein the real scheduler corresponding to each cell in the multiple cells is located in a BBU corresponding to the cell, and wherein the centralized virtual scheduler is located in any BBU of the BBUs that are placed together.

* * * * *